(12) United States Patent
Ma et al.

(10) Patent No.: US 12,535,653 B2
(45) Date of Patent: Jan. 27, 2026

(54) OPTICAL LENS ASSEMBLY AND ELECTRONIC DEVICE

(71) Applicant: Ningbo Sunny Automotive Optech Co., Ltd., Ningbo (CN)

(72) Inventors: Aolin Ma, Ningbo (CN); Dongfang Wang, Ningbo (CN); Bo Yao, Ningbo (CN)

(73) Assignee: Ningbo Sunny Automotive Optech Co., Ltd. (CN)

( * ) Notice: Subject to any disclaimer, the term of this patent is extended or adjusted under 35 U.S.C. 154(b) by 358 days.

(21) Appl. No.: 18/139,023

(22) Filed: Apr. 25, 2023

(65) Prior Publication Data

US 2023/0266564 A1     Aug. 24, 2023

Related U.S. Application Data

(63) Continuation of application No. PCT/CN2021/127568, filed on Oct. 29, 2021.

(30) Foreign Application Priority Data

Oct. 30, 2020   (CN) .......................... 202011194544.8
Oct. 30, 2020   (CN) .......................... 202011194549.0

(51) Int. Cl.
G02B 9/62      (2006.01)
G02B 13/00     (2006.01)

(52) U.S. Cl.
CPC ........... G02B 9/62 (2013.01); G02B 13/0045 (2013.01); G02B 13/006 (2013.01)

(58) Field of Classification Search
CPC . G02B 9/62; G02B 9/64; G02B 13/18; G02B 13/06; G02B 13/04; G02B 13/006;

(Continued)

(56) References Cited

U.S. PATENT DOCUMENTS 9,864,172 B1     1/2018   Tsai et al.
2009/0168201 A1  7/2009   Lai
(Continued)

FOREIGN PATENT DOCUMENTS

CN   103592743 A    2/2014
CN   108333712 A    4/2017
(Continued)

OTHER PUBLICATIONS

Translation of WO2018090938 (Year: 2025).*
(Continued)

*Primary Examiner* — Travis S Fissel
(74) *Attorney, Agent, or Firm* — Barnes & Thornburg LLP

(57) ABSTRACT

An optical lens assembly and an electronic device are provided. From an object side to an image side along an optical axis, the optical lens sequentially comprises: a first lens (L1) having a negative refractive power, wherein the object-side surface (S1) of the first lens is a convex surface, and the image-side surface (S2) of the first lens is a concave surface; a second lens (L2) having refractive power, wherein the object-side surface (S3) of the second lens is a concave surface, and the image-side surface (S4) of the second lens is a convex surface; a third lens (L3) having positive refractive power; a fourth lens (L4) having refractive power, wherein the object-side surface (S8) of the fourth lens is a convex surface; a fifth lens (L5) having refractive power; and a sixth lens (L6) having refractive power.

20 Claims, 7 Drawing Sheets

(58) Field of Classification Search
CPC ............... G02B 13/0045; G02B 13/16; G02B 13/0015; G02B 27/0172; G02B 27/0012; G02B 27/0025; G02B 15/143; H04N 5/2254; H04N 5/222
USPC ......... 359/756–762, 749, 713, 708, 656–658
See application file for complete search history.

(56) References Cited

U.S. PATENT DOCUMENTS

2011/0317285 A1* 12/2011 Ohashi ............... G02B 27/0025
359/753
2021/0018726 A1 1/2021 Feng et al.

FOREIGN PATENT DOCUMENTS

| CN | 106772957 A | 5/2017 | | |
|---|---|---|---|---|
| CN | 107462979 A | 12/2017 | | |
| CN | 108535834 A | 9/2018 | | |
| CN | 109407279 A | 3/2019 | | |
| CN | 109425957 A | 3/2019 | | |
| CN | 109581629 A | 4/2019 | | |
| CN | 208984870 U | 6/2019 | | |
| CN | 209265059 U | 8/2019 | | |
| CN | 110488467 A | 11/2019 | | |
| CN | 111562659 A | 8/2020 | | |
| CN | 113189742 A | 7/2021 | | |
| JP | 2013174741 A | 9/2013 | | |
| KR | 20150072511 A | 6/2015 | | |
| KR | 20160088092 A | 7/2016 | | |
| WO | WO-2018090938 A1 * | 5/2018 | ............. | G02B 13/02 |

OTHER PUBLICATIONS

International Search Report for Application No. PCT/CN2020/101982, dated Aug. 5, 2020, 4 pages.
International Search Report for Application No. PCT/CN2021/127568, dated Jan. 5, 2022, 5 pages.

* cited by examiner

OPTICAL LENS ASSEMBLY AND ELECTRONIC DEVICE

CROSS-REFERENCE TO RELATED APPLICATIONS

This patent application is a U.S. continuation of International Application No. PCT/CN2021/127568, filed on Oct. 29, 2021, which claims priority to Chinese patent application No. 202011194544.8 filed on Oct. 30, 2020, entitled "Optical Lens Assembly and Electronic Device" and Chinese patent application No. 202011194549.0 filed on Oct. 30, 2020, entitled "Optical Lens Assembly and Electronic Device". The full text of these two applications is incorporated by reference into this application.

TECHNICAL FIELD

The present disclosure relates to the field of optical element, in particular, to an optical lens assembly and an electronic device.

BACKGROUND

In recent years, with the rapid development of automobile auxiliary driving systems, vehicle-mounted optical lens assemblies play an important role as a tool for acquiring external information in the automobile auxiliary driving systems. In order to acquire the information more accurately, the automobile auxiliary driving systems need to be equipped with larger, higher resolution chips. Therefore, requirements for the resolution of the optical lens assemblies are higher and higher. At the same time, considering that actual road detection is complicated, the optical lens assemblies are required to have good recognition ability for objects of different colors, so high requirements are put forward on chromatic aberrations of the optical lens assemblies themselves. In addition, in order to meet requirements for higher imaging quality, the optical lens assemblies tend to choose more lens configurations, but this may lead to an increase in the cost of optical lens assembly processing, and may seriously affect miniaturization of the optical lens assemblies. In particular, in order to improve the imaging quality of the existing vehicle-mounted optical lens assemblies, most lens assembly manufacturers usually increase the number of lenses to improve imaging capabilities of the lens assemblies, but this may increase the cost to some extent, and also seriously affect the miniaturization characteristics of the lens assemblies. In addition, for safety reasons, the vehicle-mounted optical lens assemblies applied to the field of autonomous driving also need to have high stability and need to be able to cope with a variety of harsh environments, to avoid significant performance degradation of the optical lens assemblies in different environments.

SUMMARY

The present disclosure provides an optical lens assembly that may be adapted to in-vehicle mounting and may at least or partially solve at least one of the above shortcomings in the prior art.

In a first aspect, the present disclosure provides an optical lens assembly. The optical lens assembly comprises, sequentially along an optical axis from an object side to an image side: a first lens, having a negative refractive power, an object-side surface of the first lens being a convex surface, and an image-side surface of the first lens being a concave surface; a second lens, having a negative refractive power, an object-side surface of the second lens being a concave surface, and an image-side surface of the second lens being a convex surface; a third lens, having a positive refractive power, an object-side surface of the third lens being a convex surface, and an image-side surface of the third lens being a convex surface; a fourth lens, having a negative refractive power, an object-side surface of the fourth lens being a convex surface, and an image-side surface of the fourth lens being a concave surface; a fifth lens, having a positive refractive power, an object-side surface of the fifth lens being a convex surface, and an image-side surface of the fifth lens being a convex surface; and a sixth lens having a refractive power.

In an embodiment, the sixth lens has a negative refractive power, an object-side surface of the sixth lens is a convex surface, and an image-side surface of the sixth lens is a concave surface.

In an embodiment, the sixth lens has a negative refractive power, an object-side surface of the sixth lens is a concave surface, and an image-side surface of the sixth lens is a concave surface.

In an embodiment, the sixth lens has a negative refractive power, an object-side surface of the sixth lens is a concave surface, and an image-side surface of the sixth lens is a convex surface.

In an embodiment, the sixth lens has a positive refractive power, an object-side surface of the sixth lens is a convex surface, and an image-side surface of the sixth lens is a concave surface.

In an embodiment, the sixth lens has a positive refractive power, an object-side surface of the sixth lens is a concave surface, and an image-side surface of the sixth lens is a convex surface.

In an embodiment, the sixth lens has a positive refractive power, an object-side surface of the sixth lens is a convex surface, and an image-side surface of the sixth lens is a convex surface.

In an embodiment, the fourth lens and the fifth lens are cemented to form a cemented lens.

In an embodiment, at least two of the second lens, the third lens and the sixth lens are aspheric lenses.

In an embodiment, a distance TTL from a center of the object-side surface of the first lens to an image plane of the optical lens assembly on the optical axis and a total effective focal length F of the optical lens assembly satisfy: TTL/F≤6.

In an embodiment, a distance TTL from a center of the object-side surface of the first lens to an image plane of the optical lens assembly on the optical axis, half of a maximal field-of-view FOV of the optical lens assembly and half of an image height H corresponding to the maximal field-of-view of the optical lens assembly satisfy: TTL/H/FOV≤0.3.

In an embodiment, half of a maximal field-of-view FOV of the optical lens assembly, a maximal half-aperture D of the object-side surface of the first lens corresponding to the maximal field-of-view of the optical lens assembly and half of an image height H corresponding to the maximal field-of-view of the optical lens assembly satisfy: D/H/FOV≤0.1.

In an embodiment, a distance TTL from a center of the object-side surface of the first lens to an image plane of the optical lens assembly on the optical axis and a distance BFL from a center of an image-side surface of the sixth lens to the image plane on the optical axis satisfy: BFL/TTL≤0.07.

In an embodiment, an effective focal length F4 of the fourth lens and an effective focal length F5 of the fifth lens satisfy: 0.4≤|F5/F4|≤2.

In an embodiment, an effective focal length F6 of the sixth lens and a total effective focal length F of the optical lens assembly satisfy: $|F6/F| \geq 2.3$.

In an embodiment, a distance d2 from a center of the object-side surface of the second lens to a center of the image-side surface of the second lens and a distance TTL from a center of the object-side surface of the first lens to an image plane of the optical lens assembly on the optical axis satisfy: $d2/TTL \leq 0.25$.

In an embodiment, a spacing distance d56 from a center of the image-side surface of the fifth lens to a center of an object-side surface of the sixth lens on the optical axis and a distance TTL from a center of the object-side surface of the first lens to an image plane of the optical lens assembly on the optical axis satisfy: $0.01 \leq d56/TTL \leq 0.25$.

In an embodiment, a radius of curvature R21 of the object-side surface of the second lens, a radius of curvature R22 of the image-side surface of the second lens, and a distance d2 from a center of the object-side surface of the second lens to a center of the image-side surface of the second lens satisfy: $0.5 \leq (|R21|+d2)/|R22| \leq 2$.

In an embodiment, a total effective focal length F of the optical lens assembly, half of a maximal field-of-view FOV of the optical lens assembly, and half of an image height H corresponding to the maximal field-of-view of the optical lens assembly satisfy: $(FOV \times F)/H \leq 65°$.

In an embodiment, a radius of curvature R11 of the object-side surface of the first lens, a radius of curvature R12 of the image-side surface of the first lens, and a distance d1 from a center of the object-side surface of the first lens to a center of the image-side surface of the first lens satisfy: $R11/(R12+d1) \geq 1.55$.

In an embodiment, a conditional expression is satisfied: $\arctan(D41/(R41-SAG41)) \geq 0.1$, where R41 is a radius of curvature of the object-side surface of the fourth lens; D41 is a maximal half-aperture of the object-side surface of the fourth lens corresponding to a maximal field-of-view of the optical lens assembly; and SAG41 is a sag height Sg value of the object-side surface of the fourth lens corresponding to the maximal field-of-view of the optical lens assembly.

In a second aspect, the present disclosure provides an optical lens assembly. The optical lens assembly comprises, sequentially along an optical axis from an object side to an image side: a first lens, having a negative refractive power, an object-side surface of the first lens being a convex surface, and an image-side surface of the first lens being a concave surface; a second lens, having a refractive power, an object-side surface of the second lens being a concave surface, and an image-side surface of the second lens being a convex surface; a third lens, having a positive refractive power, an object-side surface of the third lens being a convex surface, and an image-side surface of the third lens being a convex surface; a fourth lens, having a negative refractive power, an object-side surface of the fourth lens being a convex surface, and an image-side surface of the fourth lens being a concave surface; a fifth lens, having a positive refractive power, an object-side surface of the fifth lens being a convex surface, and an image-side surface of the fifth lens being a convex surface; and a sixth lens having a positive refractive power.

In an embodiment, the second lens has a positive refractive power or a negative refractive power.

In an embodiment, an object-side surface of the sixth lens is a convex surface, and an image-side surface of the sixth lens is a concave surface.

In an embodiment, an object-side surface of the sixth lens is a concave surface, and an image-side surface of the sixth lens is a convex surface.

In an embodiment, an object-side surface of the sixth lens is a convex surface, and an image-side surface of the sixth lens is a convex surface.

In an embodiment, the fourth lens and the fifth lens are cemented to form a cemented lens.

In an embodiment, at least two of the second lens, the third lens and the sixth lens are aspheric lenses.

In an embodiment, a distance TTL from a center of the object-side surface of the first lens to an image plane of the optical lens assembly on the optical axis and a total effective focal length F of the optical lens assembly satisfy: $TTL/F \leq 8$.

In an embodiment, a distance TTL from a center of the object-side surface of the first lens to an image plane of the optical lens assembly on the optical axis, half of a maximal field-of-view FOV of the optical lens assembly and half of an image height H corresponding to the maximal field-of-view of the optical lens assembly satisfy: $TTL/H/FOV \leq 0.3$.

In an embodiment, half of a maximal field-of-view FOV of the optical lens assembly, a maximal half-aperture D of the object-side surface of the first lens corresponding to the maximal field-of-view of the optical lens assembly and half of an image height H corresponding to the maximal field-of-view of the optical lens assembly satisfy: $D/H/FOV \leq 0.1$.

In an embodiment, a distance BFL from a center of an image-side surface of the sixth lens to an image plane of the optical lens assembly on the optical axis and a distance TTL from a center of the object-side surface of the first lens to the image plane of the optical lens assembly on the optical axis satisfy: $BFL/TTL \geq 0.06$.

In an embodiment, an effective focal length F4 of the fourth lens and an effective focal length F5 of the fifth lens satisfy: $0.4 \leq |F5/F4| \leq 2.5$.

In an embodiment, an effective focal length F6 of the sixth lens and a total effective focal length F of the optical lens assembly satisfy: $|F6/F| \geq 2.3$.

In an embodiment, a distance d6 from a center of an object-side surface of the sixth lens to a center of an image-side surface of the sixth lens and a distance TTL from a center of the object-side surface of the first lens to an image plane of the optical lens assembly on the optical axis satisfy: $d6/TTL \leq 0.25$.

In an embodiment, a spacing distance d56 from a center of the image-side surface of the fifth lens to a center of an object-side surface of the sixth lens on the optical axis and a distance TTL from a center of the object-side surface of the first lens to an image plane of the optical lens assembly on the optical axis satisfy: $0.009 \leq d56/TTL \leq 0.25$.

In an embodiment, half of a maximal field-of-view FOV of the optical lens assembly, a total effective focal length F of the optical lens assembly and half of an image height H corresponding to the maximal field-of-view of the optical lens assembly satisfy: $(FOV \times F)/H \leq 70°$.

In an embodiment, a radius of curvature R11 of the object-side surface of the first lens, a radius of curvature R12 of the image-side surface of the first lens, and a distance d1 from a center of the object-side surface of the first lens to a center of the image-side surface of the first lens satisfy: $R11/(R12+d1) \geq 1.55$.

In an embodiment, a maximal half-aperture D41 of the object-side surface of the fourth lens corresponding to a maximal field-of-view of the optical lens assembly, a radius of curvature R41 of the object-side surface of the fourth lens and a distance SAG41 from an intersection of the object-side surface of the fourth lens and the optical axis to the maximal half-aperture of the object-side surface of the fourth lens on the optical axis satisfy: $\arctan(D41/(R41-SAG41)) \geq 0.02$.

In an embodiment, a maximal half-aperture D21 of the object-side surface of the second lens corresponding to a maximal field-of-view of the optical lens assembly, a maximal half-aperture D22 of the image-side surface of the second lens corresponding to the maximal field-of-view of the optical lens assembly, a distance SAG21 from an intersection of the object-side surface of the second lens and the optical axis to the maximal half-aperture of the object-side surface of the second lens on the optical axis, and a distance SAG22 from an intersection of the image-side surface of the second lens and the optical axis to the maximal half-aperture of the image-side surface of the second lens on the optical axis satisfy: $0.5 \leq \arctan(SAG21/D21)/\arctan(SAG22/D22) \leq 3$.

In a third aspect, the present disclosure provides an electronic device. The electronic device includes the optical lens assembly provided by the present disclosure and an imaging element used to convert an optical image formed by the optical lens assembly into an electrical signal.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings.

DETAILED DESCRIPTION OF EMBODIMENTS

Figure 1:
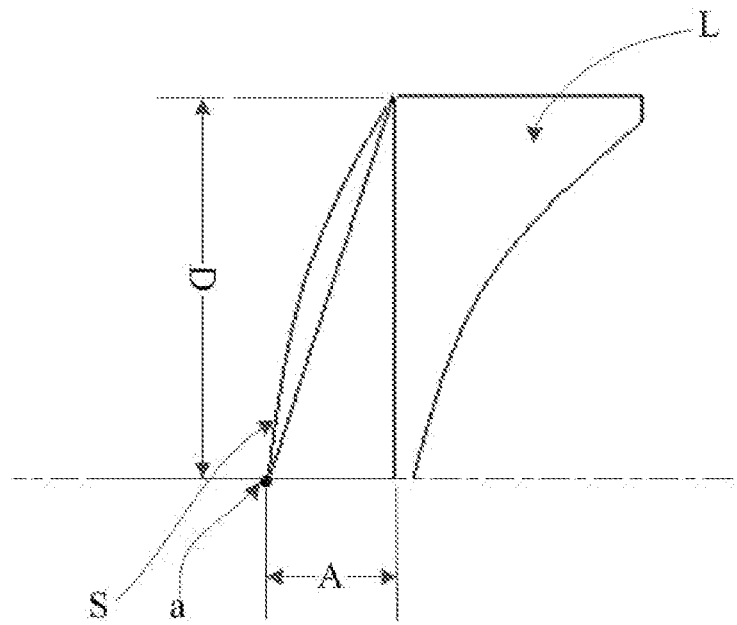
FIG. 1 shows a maximal half-aperture D of an object-side surface of a lens and its corresponding sag height Sg value A.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image side is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical lens assembly according to exemplary implementations of the present disclosure may include, for example, six lenses (i.e., a first lens, a second lens, a third lens, a fourth lens, a fifth lens and a sixth lens) having refractive powers. The six lenses are arranged in sequence along an optical axis from an object side to an image side.

The optical lens assembly according to the exemplary implementations of the present disclosure may further include a photosensitive element disposed on an image plane. Alternatively, the photosensitive element disposed on the image plane may be a charge coupled device (CCD) or complementary metal-oxide semiconductor element (CMOS).

In the exemplary implementations, the first lens may have a negative refractive power, an object-side surface of the first lens may be a convex surface, and an image-side surface of the first lens may be a concave surface. Arranging the first lens in a meniscus shape facing the object side, may avoid excessive divergence of light entering the optical system, facilitate the control of a rear aperture of the optical system, and realize miniaturization of the optical lens assembly. Also, large field-of-view light entering a rear of the optical system can be collected as much as possible, thus effectively increasing the amount of admitted light. In addition, arranging the object-side surface of the first lens as a convex surface is conducive to the sliding of water droplets in an actual use environment (such as rain and snow), which may effectively reduce the impact of harsh environments on imaging.

In the exemplary implementations, the second lens may have a negative refractive power, an object-side surface of the second lens may be a concave surface, and an image-side surface of the second lens may be a convex surface. Arranging the second lens in a meniscus shape facilitates a smooth transition of light entering the optical system to the rear. Aspheric lenses have a better radius-of-curvature characteristic, and in use, at least one of the object-side surface and the image-side surface of the second lens may be arranged as an aspheric surface to further improve a resolution quality of the lens assembly.

In the exemplary implementations, the third lens may have a positive refractive power, an object-side surface of the third lens may be a convex surface, and an image-side surface of the third lens may be a convex surface. Arranging the third lens in a dual-convex shape facilitates the convergence of light entering the optical system. The third lens may be prepared with medium and high refractive index materials, which is conducive to reducing a front-end diameter of the optical lens assembly and improving an imaging quality. Aspheric lenses have a better radius-of-curvature characteristic, and in use, at least one of the object-side surface and the image-side surface of the third lens may be arranged as an aspheric surface to further improve the resolution quality of the lens assembly.

As known to those skilled in the art, the cemented lens may be used to reduce or eliminate chromatic aberrations to the greatest extent. The use of the cemented lens in the optical lens assembly can improve the imaging quality and reduce the reflection loss of light energy, thereby improving imaging clarity of the lens assembly. In addition, the use of the cemented lens may also simplify assembling procedures in the process of manufacturing the lens assembly.

In the exemplary implementations, the image-side surface of the fourth lens and the object-side surface of the fifth lens may be cemented to form a cemented lens. The use of the cemented lens in the optical lens assembly helps to reduce an air spacing between the lenses, making the entire optical system more compact. At the same time, reducing the number of assembly components between the fourth lens and the fifth lens can reduce processing procedures and the cost of the optical lens assembly. In addition, it can also reduce tolerance sensitivity problems such as tilt, eccentricity of a lens unit during assembling. Moreover, it can also reduce the loss in the amount of light caused by reflection between lenses, thereby improving illumination. Secondly, it can also eliminate chromatic aberrations, as well as residual chromatic aberrations to balance the system's chromatic aberrations. In the cemented lens, the fourth lens close to the object side may have a negative refractive power and the fifth lens close to the image side may have a positive refractive power, where the lens having a positive refractive power may select a low refractive index material for the purpose of eliminating the chromatic aberrations in the optical system. The setting of the cemented lens facilitates the smooth transition of incident light to a rear lens, which makes various aberrations in the optical system be fully corrected, and improves the resolution of the optical lens assembly, optimizes optical performance such as Chief-Ray-Angle (CRA) and distortion of the optical lens assembly while maintaining a compact structure of the optical lens assembly. Of course, the fourth lens and the fifth lens may also not be cemented, which is conducive to improving the resolution.

In the exemplary implementations, positions of the fourth lens having a negative refractive power and the fifth lens having a positive refractive power in the cemented lens are interchangeable.

The use of the cemented part facilitates sharing an overall chromatic aberration correction of the system, and thus may effectively correct aberrations to improve the resolution. In addition, after the use of the cemented part, the optical system may be made compact as a whole, thus better meeting the miniaturization requirement.

In the exemplary implementations, the sixth lens may have a positive refractive power or a negative refractive power. The sixth lens may be in a concave-convex shape, a dual-convex shape, a convex-concave shape and a dual-concave shape. The sixth lens is provided to facilitate a smooth entry of light from the front into the image plane and improve the imaging quality. In use, at least one of an object-side surface and an image-side surface of the sixth lens may be arranged as an aspheric surface to further improve the resolution quality of the lens assembly.

In the exemplary implementations, a distance TTL from a center of the object-side surface of the first lens to the image plane of the optical lens assembly on the optical axis and a total effective focal length F of the optical lens assembly may satisfy: $TTL/F \leq 6$. For example, $TTL/F \leq 5$. Reasonably controlling an interrelationship between the total track length of the optical lens assembly and the total effective focal length of the optical lens assembly may realize miniaturization of the optical lens assembly.

In the exemplary implementations, the distance TTL from the center of the object-side surface of the first lens to the image plane of the optical lens assembly on the optical axis, half of a maximal field-of-view FOV of the optical lens assembly and half of an image height H corresponding to the maximal field-of-view of the optical lens assembly may satisfy: TTL/H/FOV≤0.3. For example, TTL/H/FOV≤0.2. Reasonably controlling an interrelationship between the total track length of the optical lens assembly, half of the maximal field-of-view of the optical lens assembly and half of the image height corresponding to the maximal field-of-view of the optical lens assembly, is conducive to miniaturization of the optical system, may effectively reduce a size of the optical lens assembly with the same image plane and the same image height.

In the exemplary implementations, half of the maximal field-of-view FOV of the optical lens assembly, a maximal half-aperture D of the object-side surface of the first lens corresponding to the maximal field-of-view of the optical lens assembly and half of the image height H corresponding to the maximal field-of-view of the optical lens assembly may satisfy: D/H/FOV≤0.1. For example, D/H/FOV≤0.05. Reasonably controlling an interrelationship between half of the maximal field-of-view of the optical lens assembly, the maximal half-aperture of the object-side surface of the first lens corresponding to the maximal field-of-view of the optical lens assembly and half of the image height corresponding to the maximal field-of-view of the optical lens assembly may ensure a small front-end diameter of the optical lens assembly and realize miniaturization of the optical lens assembly.

In the exemplary implementations, the distance TTL from the center of the object-side surface of the first lens to the image plane of the optical lens assembly on the optical axis and a distance BFL from a center of the image-side surface of the sixth lens to the image plane on the optical axis may satisfy: BFL/TTL≥0.07. For example, BFL/TTL≥0.09. By controlling a ratio of an optical back focus of the optical lens assembly to the total track length of the optical lens assembly within a reasonable range of values, a length of the back focus of the optical lens assembly may be ensured on the basis of miniaturization of the optical system, which facilitates system assembly.

In the exemplary implementations, an effective focal length F4 of the fourth lens and an effective focal length F5 of the fifth lens may satisfy: 0.4≤|F5/F4|≤2. For example, 0.5≤|F5/F4|≤1.5. By controlling a ratio of the effective focal length of the fourth lens to the effective focal length of the fifth lens within a reasonable range of values, the focal lengths of the two lenses in the cemented lens are close to each other, which facilitates the smooth transition of light and correction of the chromatic aberrations in the optical system.

In the exemplary implementations, an effective focal length F6 of the sixth lens and the total effective focal length F of the optical lens assembly may satisfy: |F6/F|≥2.3. For example, |F6/F|≥3. Reasonably controlling an interrelationship between the effective focal length of the sixth lens and the total effective focal length of the optical lens assembly helps to improve the optical performance of the optical lens assembly in high and low temperature environments.

In the exemplary implementations, a center thickness of the second lens (a distance from a center of the object-side surface of the second lens to a center of the image-side surface of the second lens) d2 and the distance TTL from the center of the object-side surface of the first lens to the image plane of the optical lens assembly on the optical axis may satisfy: d2/TTL≤0.25. For example, d2/TTL≤0.2. By controlling a ratio of the center thickness of the second lens to the total track length of the optical lens assembly within a reasonable range of values, it helps the optical lens assembly to ensure the optical performance and miniaturization while reducing costs.

In the exemplary implementations, a spacing distance d56 from a center of the image-side surface of the fifth lens to a center of an object-side surface of the sixth lens on the optical axis and the distance TTL from the center of the object-side surface of the first lens to the image plane of the optical lens assembly on the optical axis may satisfy: 0.01≤d56/TTL≤0.25. For example, 0.015≤d56/TTL≤0.2. By controlling a ratio of the spacing distance from the center of the image-side surface of the fifth lens to the center of the object-side surface of the sixth lens on the optical axis to the total track length of the optical lens assembly within a reasonable range of values, the fifth lens and the sixth lens may be separated by a certain distance, which facilitates assembly of the optical lens assembly and improves ghost images.

In the exemplary implementations, a radius of curvature R21 of the object-side surface of the second lens, a radius of curvature R22 of the image-side surface of the second lens, and the center thickness of the second lens (the distance from the center of the object-side surface of the second lens to the center of the image-side surface of the second lens) d2 may satisfy: 0.5≤(|R21|+d2)/|R22|≤2. For example, 0.7≤(|R21|+d2)/|R22|≤1.6. Reasonably controlling an interrelationship between the radius of curvature of the object-side surface of the second lens, the radius of curvature of the image-side surface of the second lens and the center thickness helps to a reasonable control of the meniscus shape of the second lens, so that light entering the optical lens assembly smoothly transitions and the resolution quality is improved, while facilitating the processing of the optical lens assembly.

In the exemplary implementations, the total effective focal length F of the optical lens assembly, half of the maximal field-of-view FOV of the optical lens assembly and half of the image height H corresponding to the maximal field-of-view of the optical lens assembly may satisfy: (FOV×F)/H≤65°. For example, (FOV×F)/H≤62°. Reasonably controlling an interrelationship between the total effective focal length of the optical lens assembly, half of the maximal field-of-view of the optical lens assembly and half of the image height corresponding to the maximal field-of-view of the optical lens assembly may make the optical lens assembly have characteristics such as small distortion and long focal length, capable of matching a larger chip.

In the exemplary implementations, a radius of curvature R11 of the object-side surface of the first lens, a radius of curvature R12 of the image-side surface of the first lens and a center distance of the first lens (a distance from the center of the object-side surface of the first lens to a center of the image-side surface of the first lens) d1 may satisfy: R11/(R12+d1)≥1.55. For example, R11/(R12+d1)≥1.65. Reasonably controlling an interrelationship between the radius of curvature of the object-side surface of the first lens, the radius of curvature of the image-side surface of the first lens and the center thickness of the first lens is conducive to reasonable setting of the shape of the first lens, which helps to collect large field-of-view light entering the optical system, and increases the field-of-view.

In the exemplary implementations, a radius of curvature R41 of the object-side surface of the fourth lens, a maximal half-aperture D41 of the object-side surface of the fourth lens corresponding to the maximal field-of-view of the optical lens assembly and a sag height Sg value SAG41 of the object-side surface of the fourth lens corresponding to the maximal field-of-view of the optical lens assembly may satisfy: arctan(D41/(R41−SAG41))≥0.1. For example, arctan(D41/(R41−SAG41))≥0.15. As shown in FIG. 1, D denotes the maximal half-aperture of the object-side surface S of the lens L, and A denotes the corresponding sag height Sg value, which is a distance from an intersection a of the object-side surface S of the lens L and the optical axis to the maximal half-aperture of the object-side surface S of the lens L on the optical axis. Reasonably controlling an interrelationship between the radius of curvature of the object-side surface of the fourth lens, the maximal half-aperture of the object-side surface of the fourth lens corresponding to the maximal field-of-view of the optical lens assembly and the sag height Sg value of the object-side surface of the fourth lens corresponding to the maximal field-of-view of the optical lens assembly, is conducive to the reasonable control of a tension angle of the object-side surface of the fourth lens, and helps to reduce ghost images of the optical lens assembly.

In the exemplary implementations, a diaphragm may be disposed between the second lens and the third lens to further improve the imaging quality of the optical lens assembly. Disposing the diaphragm between the second lens and the third lens is conducive to increasing a diameter of the diaphragm, to further improve the imaging quality of the lens assembly. The diaphragm may effectively converge the light entering the optical system, and reduce the diameter of the lens. However, it should be noted that the position of the diaphragm disclosed herein is only an example, rather than limitation. In alternative implementations, the diaphragm may be disposed at other positions according to actual needs. In the exemplary implementations, as desired, the optical lens assembly of the present disclosure may further include an optical filter and/or a protective glass disposed between the sixth lens and the image plane, to filter light with different wavelengths, and prevent elements (e.g., chips) on the image side of the optical lens assembly from being damaged. In the exemplary implementations, the object-side surface and the image-side surface of at least one of the first lens and the sixth lens may be an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality of the lens assembly. For example, at least one of the object-side surface and the image-side surface of the second lens, the third lens and the sixth lens may be an aspheric surface to further improve the resolution quality. However, the number of aspheric lenses of the optical lens assembly according to the present disclosure may be increased in order to improve the imaging quality. For example, when the resolution quality and the reliability are the focus, the first lens to the sixth lens may all be aspheric lenses, such as glass aspheric lenses.

By the reasonable setting of the shapes and refractive powers of the lenses, in the situation where only six lenses are used, the optical lens assembly according to the above implementations of the present disclosure enables the optical lens assembly to achieve at least one beneficial effect such as high resolution (which can be up to 8 million pixels or more), good chromatic aberration, small distortion, low cost, good ghost image performance, miniaturization and good imaging quality at high and low temperatures. At the same time, the optical system also takes into account the requirements of small lens assembly size, small front-end diameter, low sensitivity and high production yield. The optical lens assembly also has a small CRA, which may effectively prevent generation of stray light from hitting a lens barrel when light exits from a back end, and may be well matched with on-board chips, without color cast and vignetting. The optical lens assembly has a long total effective focal length to allow the optical lens assembly to have large angular resolution and improve the recognition to environmental objects. The optical lens assembly also has good chromatic aberration correction ability, which may accurately recognize objects of different colors in road detection. At the same time, the optical lens assembly also has a better temperature performance, which is conducive to an imaging effect of the optical lens assembly in high and low temperature environments with less change and stable image quality, is conducive to the optical lens assembly being used in most environments, and may greatly improve the safety of autonomous driving.

The optical lens assembly according to the above implementations of the present disclosure is provided with the cemented lens to share the overall chromatic aberration correction of the system, which is not only conducive to correcting the aberrations of the system, improving the resolution quality of the system and reducing the problem of matching sensitivity, but also conducive to making the overall structure of the optical system compact and meeting the miniaturization requirement.

In the exemplary implementations, the first lens to the sixth lens in the optical lens assembly may all be made of glass. The optical lens assembly made of glass can suppress the deviation of the back focus of the optical lens assembly caused by a temperature change, to improve the stability of the system. At the same time, the use of the glass material can avoid the influence on the normal use of the lens assembly due to the blurred image of the lens assembly caused by the change of the high and low temperatures in the use environment. Specifically, when the resolution quality and the reliability are the focus, the first lens to the sixth lens may all be glass aspheric lenses. Of course, in application scenarios where there are low requirements for the temperature stability, the first lens to the sixth lens in the optical lens assembly can alternatively all be made of plastic or combination of glass and plastic. Using the plastic to manufacture the optical lens assembly can effectively reduce a production cost.

In exemplary implementations, an optical lens assembly includes, for example, six lenses (i.e., a first lens, a second lens, a third lens, a fourth lens, a fifth lens and a sixth lens) having refractive powers. The six lenses are arranged in sequence along an optical axis from an object side to an image side.

In the exemplary implementations, the optical lens assembly may further include a photosensitive element disposed on the image plane. Alternatively, the photosensitive element disposed on the image plane may be a charge coupled device (CCD) or complementary metal-oxide semiconductor element (CMOS).

In the exemplary implementations, the first lens may have a negative refractive power. The first lens may have a convex-concave surface type. The first lens having a negative refractive power may avoid excessive divergence of light on the object side incident to the lens assembly, so as to facilitate the control of the diameter of a rear lens, and realize miniaturization. The first lens in a meniscus shape may collect large field-of-view light as much as possible to enter a rear optical system, thus increasing the amount of admitted light. The object-side surface of the first lens is a convex surface, which is conducive to the sliding of water droplets in an actual use environment (such as rain and snow) to reduce the impact on imaging.

In the exemplary implementations, the second lens may have a positive refractive power or a negative refractive power. The second lens may have a concave-convex surface type. The setting of the refractive power and the surface type of the second lens facilitates the smooth transition of light to the rear optical system. Preferably, the second lens may have an aspheric surface to improve the resolution.

In the exemplary implementations, the third lens may have a positive refractive power. The third lens may have a convex-convex surface type. The setting of the refractive power and the surface type of the third lens facilitates the convergence of light. In particular, the third lens may be made of a high refractive index material, which is conducive to reducing a front-end diameter and improving the imaging quality. The third lens may have an aspheric surface to improve the resolution of the lens assembly.

In the exemplary implementations, the fourth lens may have a negative refractive power. The fourth lens may have a convex-concave surface type.

In the exemplary implementations, the fifth lens may have a positive refractive power. The fifth lens may have a convex-convex surface type.

In the exemplary implementations, the sixth lens may have a positive refractive power. The sixth lens may have a convex-concave surface type, a concave-convex surface type or a convex-convex surface type. The setting of the refractive power and the surface type of the sixth lens further facilitates the convergence of light. Preferably, the sixth lens may have an aspheric surface to further improve the resolution quality and the ability to correct aberrations.

In the exemplary implementations, the optical lens assembly according to the present disclosure may satisfy: $TTL/F \leq 8$, where TTL is a distance from a center of the object-side surface of the first lens to the image plane of the optical lens assembly on the optical axis, and F is a total effective focal length of the optical lens assembly. More specifically, TTL and F may further satisfy: $TTL/F \leq 7$. Satisfying $TTL/F \leq 8$ is conducive to realizing miniaturization.

In the exemplary implementations, the optical lens assembly according to the present disclosure may satisfy: $TTL/H/FOV \leq 0.3$, where TTL is the distance from the center of the object-side surface of the first lens to the image plane of the optical lens assembly on the optical axis, FOV is half of a maximal field-of-view of the optical lens assembly, and H is half of an image height corresponding to the maximal field-of-view of the optical lens assembly. More specifically, TTL, FOV and H may further satisfy: $TTL/H/FOV \leq 0.2$. Satisfying $TTL/H/FOV \leq 0.3$ is conducive to realizing miniaturization and to make the optical lens assembly smaller in size with the same image plane and image height.

In the exemplary implementations, the optical lens assembly according to the present disclosure may satisfy: $D/H/FOV \leq 0.1$, where FOV is half of the maximal field-of-view of the optical lens assembly, D is a maximal half-aperture of the object-side surface of the first lens corresponding to the maximal field-of-view of the optical lens assembly, and H is half of the image height corresponding to the maximal field-of-view of the optical lens assembly. More specifically, D, H and FOV may further satisfy: $D/H/FOV \leq 0.065$. Satisfying $D/H/FOV \leq 0.1$ is conducive to reducing the front-end diameter.

In the exemplary implementations, the optical lens assembly according to the present disclosure may satisfy: $BFL/TTL \geq 0.06$, where BFL is a distance from a center of an image-side surface of the sixth lens to the image plane of the optical lens assembly on the optical axis, and TTL is the distance from the center of the object-side surface of the first lens to the image plane of the optical lens assembly on the optical axis. More specifically, BFL and TTL may further satisfy: $BFL/TTL \geq 0.08$. Satisfying $BFL/TTL \geq 0.06$ may make the back focus BFL of the optical lens assembly have a certain length (longer) on the basis of realizing miniaturization, easy to assemble.

In the exemplary implementations, the optical lens assembly according to the present disclosure may satisfy: $0.4 \leq |F5/F4| \leq 2.5$, where F4 is an effective focal length of the fourth lens, and F5 is an effective focal length of the fifth lens. More specifically, F5 and F4 may further satisfy: $0.6 \leq |F5/F4| \leq 2$. Satisfying $0.4 \leq |F5/F4| \leq 2.5$ is conducive to the smooth transition of light, and correcting the chromatic aberrations.

In the exemplary implementations, the optical lens assembly according to the present disclosure may satisfy: $|F6/F| \geq 2.3$, where F6 is an effective focal length of the sixth lens, and F is the total effective focal length of the optical lens assembly. More specifically, F6 and F may further satisfy: $|F6/F| \geq 3.5$. F6 and F may further satisfy: $|F6/F| \geq 7$. Satisfying $|F6/F| \geq 2.3$ is conducive to correcting the chromatic aberrations.

In the exemplary implementations, the optical lens assembly according to the present disclosure may satisfy: $d6/TTL \leq 0.25$, where d6 is a center thickness of the sixth lens, i.e., a distance from a center of an object-side surface of the sixth lens to a center of the image-side surface of the sixth lens, and TTL is the distance from the center of the object-side surface of the first lens to the image plane of the optical lens assembly on the optical axis. More specifically, d6 and TTL may further satisfy: $d6/TTL \leq 0.18$. Satisfying $d6/TTL \leq 0.25$ may shorten the TTL and reduce costs under the premise of ensuring the imaging quality.

In the exemplary implementations, the optical lens assembly according to the present disclosure may satisfy: $0.009 \leq d56/TTL \leq 0.25$, where d56 is a spacing distance from a center of the image-side surface of the fifth lens to a center of the object-side surface of the sixth lens on the optical axis, and TTL is the distance from the center of the object-side surface of the first lens to the image plane of the optical lens assembly on the optical axis. More specifically, d56 and TTL may further satisfy: $0.01 \leq d56/TTL \leq 0.2$. Satisfying $0.009 \leq d56/TTL \leq 0.25$ is conducive to improving ghost images, while facilitating assembling the lens assembly.

In the exemplary implementations, the optical lens assembly according to the present disclosure may satisfy: $(FOV \times F)/H \leq 70°$, where FOV is half of the maximal field-of-view of the optical lens assembly, F is the total effective focal length of the optical lens assembly, and H is half of the image height corresponding to the maximal field-of-view of the optical lens assembly. More specifically, FOV, F and H may further satisfy: $(FOV \times F)/H \leq 65°$. Satisfying $(FOV \times F)/H \leq 70°$ is conducive to making the optical lens assembly have characteristics such as small distortion and long focal length, capable of matching a larger chip.

In the exemplary implementations, the optical lens assembly according to the present disclosure may satisfy: $R11/(R12+d1) \geq 1.55$, where R11 is a radius of curvature of the object-side surface of the first lens, R12 is a radius of curvature of the image-side surface of the first lens, and d1 is a center thickness of the first lens, i.e., a distance from the center of the object-side surface of the first lens to a center of the image-side surface of the first lens. More specifically, R11, R12 and d1 may further satisfy: R11/(R12+d1)≥1.6. Satisfying R11/(R12+d1)≥1.55 is conducive to collecting light from a larger angle into the optical lens assembly.

In the exemplary implementations, the optical lens assembly according to the present disclosure may satisfy: arctan(D41/(R41−SAG41))≥0.02, where D41 is a maximal half-aperture of the object-side surface of the fourth lens corresponding to the maximal field-of-view of the optical lens assembly, R41 is a radius of curvature of the object-side surface of the fourth lens, and SAG41 is a distance from an intersection of the object-side surface of the fourth lens and the optical axis to the maximal half-aperture of the object-side surface of the fourth lens on the optical axis. More specifically, D41, R41 and SAG41 may further satisfy: arctan(D41/(R41−SAG41))≥0.05. Satisfying arctan(D41/(R41−SAG41))≥0.02 is conducive to reducing ghost images.

In the exemplary implementations, the optical lens assembly according to the present disclosure may satisfy: 0.5≤arctan(SAG21/D21)/arctan(SAG22/D22)≤3, where D21 is a maximal half-aperture of the object-side surface of the second lens corresponding to the maximal field-of-view of the optical lens assembly, D22 is a maximal half-aperture of the image-side surface of the second lens corresponding to the maximal field-of-view of the optical lens assembly, SAG21 is a distance from an intersection of the object-side surface of the second lens and the optical axis to the maximal half-aperture of the object-side surface of the second lens on the optical axis, and SAG22 is a distance from an intersection of the image-side surface of the second lens and the optical axis to the maximal half-aperture of the image-side surface of the second lens on the optical axis. More specifically, SAG21, D21, SAG22 and D22 may further satisfy: 0.8≤arctan(SAG21/D21)/arctan(SAG22/D22)≤2. Satisfying 0.5≤arctan(SAG21/D21)/arctan(SAG22/D22)≤3 is conducive to the smooth transition of light around the lens and conducive to reducing the sensitivity of the lens.

In the exemplary implementations, a diaphragm may be disposed between the second lens and the third lens to further improve the imaging quality of the optical lens assembly. Disposing the diaphragm between the second lens and the third lens is conducive to increasing the diameter of the diaphragm, and conducive to converging the light entering the optical lens assembly, reducing the diameter of the lens and realizing miniaturization. In the implementations of the present disclosure, the diaphragm may be disposed at the vicinity of the image-side surface of the second lens or at the vicinity of the object-side surface of the third lens. However, it should be noted that the position of the diaphragm disclosed herein is only an example, rather than limitation. In alternative implementations, the diaphragm may be disposed at other positions according to actual needs.

In the exemplary implementations, as desired, the optical lens assembly of the present disclosure may further include an optical filter and/or a protective glass disposed between the sixth lens and the image plane, to filter light with different wavelengths, and prevent elements (e.g., chips) on the image side of the optical lens assembly from being damaged.

As known to those skilled in the art, the cemented lens may be used to reduce or eliminate chromatic aberrations to the greatest extent. The use of the cemented lens in the optical lens assembly can improve the imaging quality and reduce the reflection loss of light energy, thereby realizing high resolution and improving imaging clarity of the lens assembly. In addition, the use of the cemented lens may also simplify assembling procedures in the process of manufacturing the lens assembly.

In the exemplary implementations, the fourth lens and the fifth lens may be cemented to form a cemented lens. The fourth lens having a negative refractive power and convex on the object-side surface and concave on the image-side surface and the fifth lens having a positive refractive power and convex on the object-side surface and the image-side surface are cemented, which is conducive to making the optical lens assembly compact in structure, reducing the size of the optical lens assembly, correcting various types of aberrations of the optical lens assembly, and improving the optical performance such as the resolution, CRA, and optimizing distortion of the optical lens assembly while reducing the total length of the optical lens assembly. Of course, the fourth lens and the fifth lens may also not be cemented, which is conducive to improving the resolution ability.

In the exemplary implementations, positions of the fourth lens having a negative refractive power and the fifth lens having a positive refractive power in the cemented lens are interchangeable. In particular, the fifth lens having a positive refractive power is preferably made of a low refractive index material, to achieve the purpose of eliminating chromatic aberrations.

The cementing approach between the above lenses has at least one of the following advantages: reducing the chromatic aberrations of the lenses, reducing the tolerance sensitivity, and balancing the overall chromatic aberration of the system through residual chromatic aberrations; reducing the spacing distance between the two lenses, thereby reducing the total length of the system; reducing the assembly component between lenses, thereby reducing procedures and costs; reducing the tolerance sensitivity problems such as tilt, eccentricity of a lens unit during assembling, thereby improve the production yield; reducing the loss in the amount of light caused by the reflection between lenses, thereby improving illumination; and further reducing the field curvature, thereby effectively correcting the off-axis point aberration of the optical lens assembly. Such cementing design shares the overall chromatic aberration correction of the system, the aberrations are effectively corrected to improve the resolution. The cementing design makes the optical system compact as a whole, thereby meeting the miniaturization requirement.

In the exemplary implementations, the first lens, the fourth lens and the fifth lens may be spherical lenses. The second lens, the third lens and the sixth lens may be aspheric lenses. In particular, the first lens, the second lens, the third lens, the fourth lens, the fifth lens and the sixth lens may all be aspheric lenses in order to improve the resolution quality of the optical system. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality of the lens assembly. The setting of the aspheric lens helps to correct the aberrations of the system and improve the resolution.

By the reasonable setting of the shapes and refractive powers of the lenses, in the situation where only six lenses are used, the optical lens assembly according to the above implementations of the present disclosure enables the optical lens assembly to achieve at least one beneficial effect such as high resolution (which can be up to 8 million pixels or more), low cost, small distortion, good chromatic aberration, good ghost image performance, miniaturization and good imaging quality at high and low temperatures. At the same time, the optical system also takes into account the requirements of small lens assembly size, small front-end diameter, low sensitivity and high production yield. The optical lens assembly has a long total effective focal length to allow the optical lens assembly to have large angular resolution and improve the recognition to environmental objects. The optical lens assembly also has good chromatic aberration correction ability, which may accurately recognize objects of different colors in road detection. At the same time, the optical lens assembly also has a better temperature performance, which is conducive to an imaging effect of the optical lens assembly in high and low temperature environments with less change and stable image quality, is conducive to the optical lens assembly being used in most environments, and may greatly improve the safety of autonomous driving.

The optical lens assembly according to the above implementations of the present disclosure is provided with the cemented lens to share the overall chromatic aberration correction of the system, which is not only conducive to correcting the aberrations of the system, improving the resolution quality of the system and reducing the problem of matching sensitivity, but also conducive to making the overall structure of the optical system compact and meeting the miniaturization requirement.

In the exemplary implementations, the first lens to the sixth lens in the optical lens assembly may all be made of glass. The optical lens assembly made of glass can suppress the deviation of the back focus of the optical lens assembly caused by a temperature change, to improve the stability of the system. At the same time, the use of the glass material can avoid the influence on the normal use of the lens assembly due to the blurred image of the lens assembly caused by the change of the high and low temperatures in the use environment. Specifically, when the resolution quality and the reliability are the focus, the first lens to the sixth lens may all be glass aspheric lenses. Of course, in application scenarios where there are low requirements for the temperature stability, the first lens to the sixth lens in the optical lens assembly can alternatively all be made of plastic or combination of glass and plastic. Using the plastic to manufacture the optical lens assembly can effectively reduce a production cost.

The present disclosure uses six lenses. By optimizing the shapes and refractive powers of the lenses and forming a cemented lens, etc., the optical lens assembly has at least one beneficial effect such as small chromatic aberration, high pixel, small front-end diameter, miniaturization, small distortion, low cost, good ghost image performance, or good temperature performance.

However, it should be understood by those skilled in the art that the various results and advantages described in the present specification may be obtained by changing the number of the lenses constituting the lens assembly without departing from the technical solution claimed by the present disclosure. For example, although the optical lens assembly having six lenses is described as an example in the implementations, the optical lens assembly is not limited to including the six lenses. If desired, the optical lens assembly may also include other numbers of lenses.

Specific embodiments of the optical lens assembly that may be applicable to the above implementations are further described below with reference to the accompanying drawings.

Embodiment 1

Figure 2:
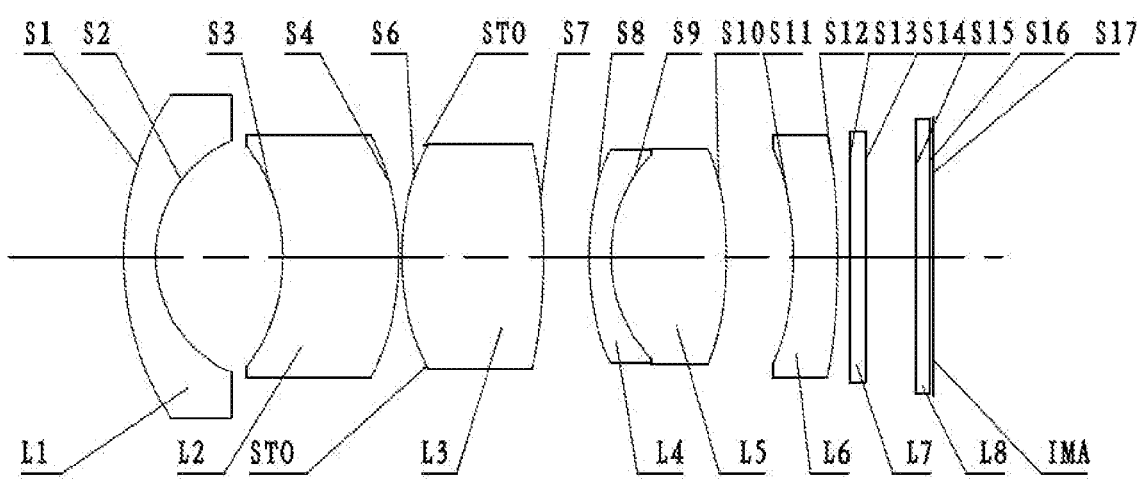
FIG. 2 is a schematic structural diagram of an optical lens assembly according to Embodiment 1 of the present disclosure.

An optical lens assembly according to Embodiment 1 of the present disclosure is described below with reference to FIG. 2. FIG. 2 is a schematic structural diagram of the optical lens assembly according to Embodiment 1 of the present disclosure.

As shown in FIG. 2, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a meniscus lens having a negative refractive power, an object-side surface S1 of the first lens is a convex surface, an image-side surface S2 of the first lens is a concave surface, and both the object-side surface S1 and the image-side surface S2 of the first lens L1 are spherical surfaces.

The second lens L2 is a meniscus lens having a negative refractive power, an object-side surface S3 of the second lens is a concave surface, an image-side surface S4 of the second lens is a convex surface, and both the object-side surface S3 and the image-side surface S4 of the second lens L2 are aspheric surfaces.

The third lens L3 is a dual-convex lens having a positive refractive power, an object-side surface S6 of the third lens is a convex surface, an image-side surface S7 of the third lens is a convex surface, and both the object-side surface S6 and the image-side surface S7 of the third lens L3 are aspheric surfaces.

The fourth lens L4 is a meniscus lens having a negative refractive power, an object-side surface S8 of the fourth lens is a convex surface, an image-side surface S9 of the fourth lens is a concave surface, and both the object-side surface S8 and the image-side surface S9 of the fourth lens L4 are spherical surfaces.

The fifth lens L5 is a dual-convex lens having a positive refractive power, an object-side surface S9 of the fifth lens is a convex surface, an image-side surface S10 of the fifth lens is a convex surface, and both the object-side surface S9 and the image-side surface S10 of the fifth lens L5 are spherical surfaces.

The sixth lens L6 has a negative refractive power. The sixth lens L6 is a meniscus lens in an area near the optical axis, an object-side surface S11 of the sixth lens in the area near the optical axis is a convex surface, an image-side surface S12 of the sixth lens in the area near the optical axis is a concave surface, and both the object-side surface S11 and the image-side surface S12 of the sixth lens L6 are aspheric surfaces.

In this embodiment, the fourth lens L4 and the fifth lens L5 may be cemented to form a cemented lens.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

In the optical lens assembly of this embodiment, the optical lens assembly may further include a diaphragm STO, and the diaphragm STO may be disposed between the second lens L2 and the third lens L3 to improve the imaging quality.

Table 1 shows a radius of curvature R, a thickness d/distance T (it should be understood that the thickness d/distance T in the row of S1 is a distance d1 from a center of the object-side surface of the first lens L1 to a center of the image-side surface of the first lens L1, and the thickness d/distance T in the row of S2 is a spacing distance T12 between the first lens L1 and the second lens L2, and so on), a refractive index Nd and an abbe number Vd of each lens of the optical lens assembly in Embodiment 1.

TABLE 1

| surface number | radius of curvature R (mm) | thickness d/distance T (mm) | material refractive index Nd | material abbe number Vd |
|---|---|---|---|---|
| S1 | 10.3300 | 1.1000 | 1.52 | 64.21 |
| S2 | 4.3821 | 4.4000 | | |
| S3 | −5.0868 | 4.0000 | 1.81 | 41.00 |
| S4 | −8.3283 | 0.9000 | | |
| STO | infinite | −0.8000 | | |
| S6 | 7.7270 | 4.9000 | 1.62 | 63.44 |
| S7 | −21.0150 | 1.5800 | | |
| S8 | 9.7000 | 0.7500 | 1.85 | 23.79 |
| S9 | 5.1640 | 4.0000 | 1.44 | 94.58 |
| S10 | −11.1760 | 2.3100 | | |
| S11 | 123.9158 | 1.5300 | 1.68 | 31.09 |
| S12 | 14.9500 | 0.4000 | | |
| S13 | infinite | 0.5500 | 1.52 | 64.21 |
| S14 | infinite | 1.7450 | | |
| S15 | infinite | 0.5000 | 1.52 | 64.21 |
| S16 | infinite | 0.1250 | | |
| S17 | infinite | | | |

In Embodiment 1, the object-side surfaces and the image-side surfaces of the second lens L2, the third lens L3 and the sixth lens L6 may all be aspheric surfaces. The surface type x of each aspheric lens may be defined using, but not limited to, the following aspheric formula:

$$x = \frac{ch^2}{1 + \sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Table 2 below gives the conic coefficient k and the high-order coefficients A4, A6, A8, A10, A12, A14 and A16 applicable to the aspheric lens surfaces S3, S4, S6, S7, S11 and S12 in Embodiment 1.

TABLE 2

| surface number | k | A4 | A6 | A8 | A10 | A12 | A14 | A16 |
|---|---|---|---|---|---|---|---|---|
| S3 | 0.1428 | 2.1591E−03 | −2.0018E−05 | 3.9547E−06 | −1.5523E−07 | 7.2059E−09 | −2.3718E−10 | 1.0165E−11 |
| S4 | −0.5890 | 1.4814E−04 | 2.9240E−05 | −2.2790E−06 | 1.1451E−07 | −3.2413E−09 | 5.3018E−11 | −4.6404E−13 |
| S6 | −1.1817 | −4.8440E−04 | 6.3489E−05 | −8.1808E−06 | 8.0014E−07 | −5.0670E−08 | 1.8379E−09 | −2.8446E−11 |
| S7 | 7.7883 | −2.4779E−04 | 1.8242E−05 | −9.4166E−07 | 1.5453E−07 | −1.4713E−08 | 6.8964E−10 | −1.2101E−11 |
| S11 | 132.6859 | −4.7012E−03 | 5.4338E−06 | 8.3224E−06 | −1.1530E−06 | 1.0519E−07 | −4.8543E−09 | 9.7846E−11 |
| S12 | −109.5905 | −9.9945E−04 | −5.0579E−04 | 7.9308E−05 | −7.1099E−06 | 3.8809E−07 | −1.1626E−08 | 1.4665E−10 |

Embodiment 2

Figure 3:
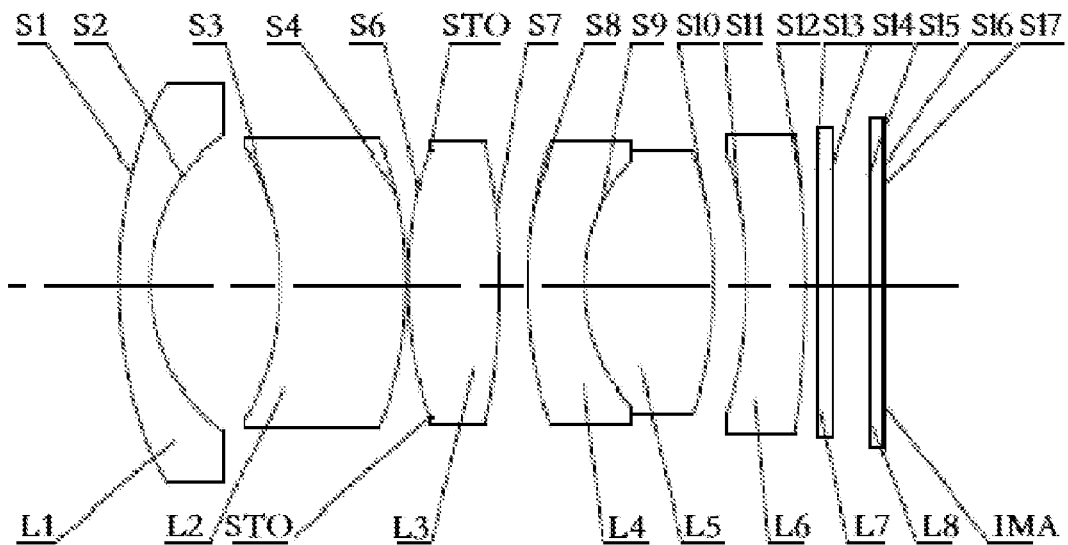
FIG. 3 is a schematic structural diagram of an optical lens assembly according to Embodiment 2 of the present disclosure.

An optical lens assembly according to Embodiment 2 of the present disclosure is described below with reference to FIG. 3. FIG. 3 is a schematic structural diagram of the optical lens assembly according to Embodiment 2 of the present disclosure.

As shown in FIG. 3, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a meniscus lens having a negative refractive power, an object-side surface S1 of the first lens is a convex surface, an image-side surface S2 of the first lens is a concave surface, and both the object-side surface S1 and the image-side surface S2 of the first lens L1 are spherical surfaces.

The second lens L2 is a meniscus lens having a negative refractive power, an object-side surface S3 of the second lens is a concave surface, an image-side surface S4 of the second lens is a convex surface, and both the object-side surface S3 and the image-side surface S4 of the second lens L2 are aspheric surfaces.

The third lens L3 is a dual-convex lens having a positive refractive power, an object-side surface S6 of the third lens is a convex surface, an image-side surface S7 of the third lens is a convex surface, and both the object-side surface S6 and the image-side surface S7 of the third lens L3 are aspheric surfaces.

The fourth lens L4 is a meniscus lens having a negative refractive power, an object-side surface S8 of the fourth lens is a convex surface, an image-side surface S9 of the fourth lens is a concave surface, and both the object-side surface S8 and the image-side surface S9 of the fourth lens L4 are spherical surfaces.

The fifth lens L5 is a dual-convex lens having a positive refractive power, an object-side surface S9 of the fifth lens is a convex surface, an image-side surface S10 of the fifth lens is a convex surface, and both the object-side surface S9 and the image-side surface S10 of the fifth lens L5 are spherical surfaces.

The sixth lens L6 has a negative refractive power. The sixth lens L6 is a dual-concave lens in an area near the optical axis, an object-side surface S11 of the sixth lens in the area near the optical axis is a concave surface, an image-side surface S12 of the sixth lens in the area near the optical axis is a concave surface, and both the object-side surface S11 and the image-side surface S12 of the sixth lens L6 are aspheric surfaces.

In this embodiment, the fourth lens L4 and the fifth lens L5 may be cemented to form a cemented lens.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

In the optical lens assembly of this embodiment, the optical lens assembly may further include a diaphragm STO, and the diaphragm STO may be disposed between the second lens L2 and the third lens L3 to improve the imaging quality.

Table 3 shows a radius of curvature R, a thickness d/distance T (it should be understood that the thickness d/distance T in the row of S1 is a distance d1 from a center of the object-side surface of the first lens L1 to a center of the image-side surface of the first lens L1, and the thickness d/distance T in the row of S2 is a spacing distance T12 between the first lens L1 and the second lens L2, and so on), a refractive index Nd and an abbe number Vd of each lens of the optical lens assembly in Embodiment 2.

TABLE 3

| surface number | radius of curvature R (mm) | thickness d/distance T (mm) | refractive index Nd | abbe number Vd |
|---|---|---|---|---|
| S1 | 10.5831 | 1.1500 | 1.52 | 64.21 |
| S2 | 4.7600 | 4.6849 | | |
| S3 | −5.7000 | 4.5400 | 1.81 | 41.00 |
| S4 | −8.0000 | 0.9000 | | |
| STO | infinite | −0.8000 | | |
| S6 | 9.0169 | 3.3000 | 1.62 | 63.44 |
| S7 | −22.1282 | 1.0437 | | |
| S8 | 10.5519 | 2.0500 | 1.85 | 23.79 |
| S9 | 4.5661 | 4.6600 | 1.44 | 94.58 |
| S10 | −10.1212 | 1.1902 | | |
| S11 | −150.0000 | 2.1484 | 1.68 | 31.09 |
| S12 | 18.8412 | 0.4000 | | |
| S13 | infinite | 0.5500 | 1.52 | 64.21 |
| S14 | infinite | 1.3574 | | |
| S15 | infinite | 0.5000 | 1.52 | 64.21 |
| S16 | infinite | 0.1250 | | |
| S17 | infinite | | | |

In Embodiment 2, the object-side surfaces and the image-side surfaces of the second lens L2, the third lens L3 and the sixth lens L6 may all be aspheric surfaces. The surface type x of each aspheric lens may be defined using, but not limited to, the formula (1) in Embodiment 1. Table 4 below gives the conic coefficient k and the high-order coefficients A4, A6, A8, A10, A12, A14 and A16 applicable to the aspheric surfaces S3, S4, S6, S7, S11 and S12 in Embodiment 2.

TABLE 4

| surface number | k | A4 | A6 | A8 | A10 | A12 | A14 | A16 |
|---|---|---|---|---|---|---|---|---|
| S3 | 0.4124 | 1.1977E−03 | 2.4868E−05 | 1.4100E−06 | −2.2193E−08 | 3.4661E−09 | −2.3718E−10 | 1.0165E−11 |
| S4 | −0.9179 | 2.0237E−04 | 2.7829E−05 | −2.3303E−06 | 1.7041E−07 | 6.5356E−09 | 1.1866E−10 | −4.6404E−13 |
| S6 | −0.6192 | −3.8015E−04 | 4.6380E−05 | −7.5671E−06 | 8.0254E−07 | −5.1673E−08 | 1.8319E−09 | −2.6997E−11 |
| S7 | 10.4551 | −7.3438E−04 | 2.8364E−05 | −1.5788E−06 | 1.8468E−07 | −1.4568E−08 | 6.1151E−10 | −1.0034E−11 |
| S11 | −189.6787 | −3.9032E−03 | 5.7982E−05 | −3.3475E−06 | −2.7499E−07 | 8.0249E−08 | −4.8543E−09 | 9.7846E−11 |
| S12 | −199.0000 | −6.1363E−04 | −4.5543E−04 | 7.0830E−05 | −6.5461E−06 | 3.7023E−07 | −1.1430E−08 | 1.4665E−10 |

Embodiment 3

Figure 4:
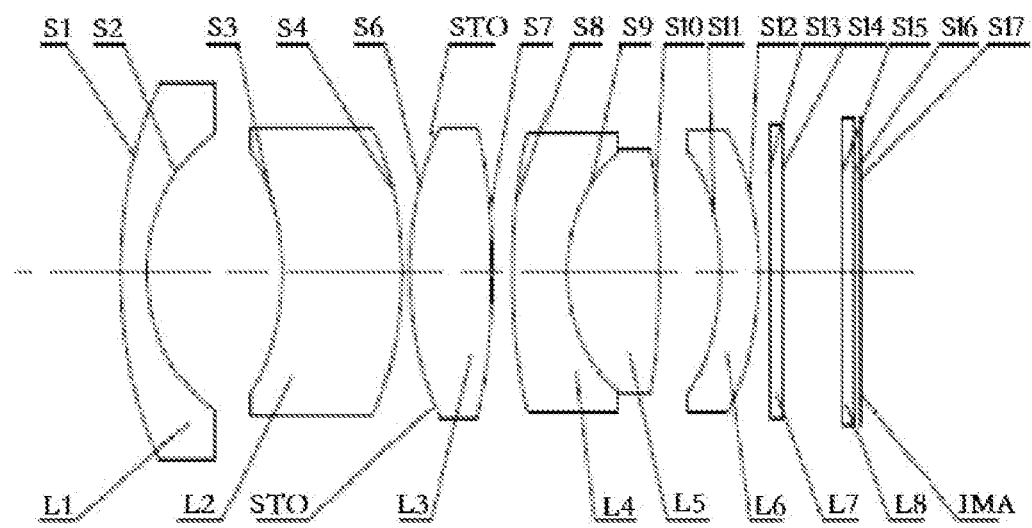
FIG. 4 is a schematic structural diagram of an optical lens assembly according to Embodiment 3 of the present disclosure.

An optical lens assembly according to Embodiment 3 of the present disclosure is described below with reference to FIG. 4. FIG. 4 is a schematic structural diagram of the optical lens assembly according to Embodiment 3 of the present disclosure.

As shown in FIG. 4, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a meniscus lens having a negative refractive power, an object-side surface S1 of the first lens is a convex surface, an image-side surface S2 of the first lens is a concave surface, and both the object-side surface S1 and the image-side surface S2 of the first lens L1 are spherical surfaces.

The second lens L2 is a meniscus lens having a negative refractive power, an object-side surface S3 of the second lens is a concave surface, an image-side surface S4 of the second lens is a convex surface, and both the object-side surface S3 and the image-side surface S4 of the second lens L2 are aspheric surfaces.

The third lens L3 is a dual-convex lens having a positive refractive power, an object-side surface S6 of the third lens is a convex surface, an image-side surface S7 of the third lens is a convex surface, and both the object-side surface S6 and the image-side surface S7 of the third lens L3 are aspheric surfaces.

The fourth lens L4 is a meniscus lens having a negative refractive power, an object-side surface S8 of the fourth lens is a convex surface, an image-side surface S9 of the fourth lens is a concave surface, and both the object-side surface S8 and the image-side surface S9 of the fourth lens L4 are spherical surfaces.

The fifth lens L5 is a dual-convex lens having a positive refractive power, an object-side surface S9 of the fifth lens is a convex surface, an image-side surface S10 of the fifth lens is a convex surface, and both the object-side surface S9 and the image-side surface S10 of the fifth lens L5 are spherical surfaces.

The sixth lens L6 has a negative refractive power. The sixth lens L6 is a meniscus lens in an area near the optical axis, an object-side surface S11 of the sixth lens in the area near the optical axis is a concave surface, an image-side surface S12 of the sixth lens in the area near the optical axis is a convex surface, and both the object-side surface S11 and the image-side surface S12 of the sixth lens L6 are aspheric surfaces.

In this embodiment, the fourth lens L4 and the fifth lens L5 may be cemented to form a cemented lens.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

In the optical lens assembly of this embodiment, the optical lens assembly may further include a diaphragm STO, and the diaphragm STO may be disposed between the second lens L2 and the third lens L3 to improve the imaging quality.

Table 5 shows a radius of curvature R, a thickness d/distance T (it should be understood that the thickness d/distance T in the row of S1 is a distance d1 from a center of the object-side surface of the first lens L1 to a center of the image-side surface of the first lens L1, and the thickness d/distance T in the row of S2 is a spacing distance T12 between the first lens L1 and the second lens L2, and so on), a refractive index Nd and an abbe number Vd of each lens of the optical lens assembly in Embodiment 3.

TABLE 5

| surface number | radius of curvature R (mm) | thickness d/distance T (mm) | refractive index Nd | abbe number Vd |
|---|---|---|---|---|
| S1 | 11.7190 | 1.0017 | 1.52 | 64.21 |
| S2 | 4.7094 | 5.1581 | | |
| S3 | −5.8500 | 4.6000 | 1.88 | 39.23 |
| S4 | −8.1200 | 1.1000 | | |
| STO | infinite | −0.8000 | | |
| S6 | 8.0928 | 3.2000 | 1.62 | 63.44 |
| S7 | −21.4343 | 0.8000 | | |
| S8 | 15.7482 | 2.0000 | 1.78 | 25.72 |
| S9 | 4.3762 | 3.6000 | 1.50 | 81.59 |
| S10 | −19.6875 | 2.3000 | | |
| S11 | −23.9317 | 1.5000 | 1.68 | 31.09 |
| S12 | −200.0000 | 0.4000 | | |
| S13 | infinite | 0.5500 | 1.52 | 64.21 |
| S14 | infinite | 2.2908 | | |
| S15 | infinite | 0.5000 | 1.52 | 64.21 |
| S16 | infinite | 0.1250 | | |
| S17 | infinite | | | |

In Embodiment 3, the object-side surfaces and the image-side surfaces of the second lens L2, the third lens L3 and the sixth lens L6 may all be aspheric surfaces. The surface type x of each aspheric lens may be defined using, but not limited to, the formula (1) in Embodiment 1. Table 6 below gives the conic coefficient k and the high-order coefficients A4, A6, A8, A10, A12, A14 and A16 applicable to the aspheric surfaces S3, S4, S6, S7, S11 and S12 in Embodiment 3.

Embodiment 4

Figure 5:
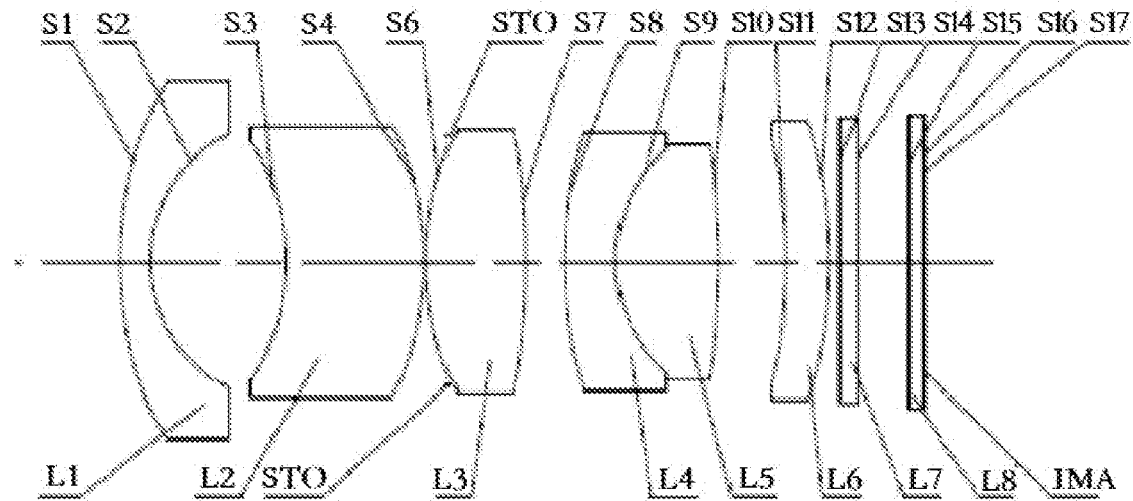
FIG. 5 is a schematic structural diagram of an optical lens assembly according to Embodiment 4 of the present disclosure.

An optical lens assembly according to Embodiment 4 of the present disclosure is described below with reference to FIG. 5. FIG. 5 is a schematic structural diagram of the optical lens assembly according to Embodiment 4 of the present disclosure.

As shown in FIG. 5, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a meniscus lens having a negative refractive power, an object-side surface S1 of the first lens is a convex surface, an image-side surface S2 of the first lens is a concave surface, and both the object-side surface S1 and the image-side surface S2 of the first lens L1 are spherical surfaces.

The second lens L2 is a meniscus lens having a negative refractive power, an object-side surface S3 of the second lens is a concave surface, an image-side surface S4 of the second lens is a convex surface, and both the object-side surface S3 and the image-side surface S4 of the second lens L2 are aspheric surfaces.

The third lens L3 is a dual-convex lens having a positive refractive power, an object-side surface S6 of the third lens is a convex surface, an image-side surface S7 of the third lens is a convex surface, and both the object-side surface S6 and the image-side surface S7 of the third lens L3 are aspheric surfaces.

The fourth lens L4 is a meniscus lens having a negative refractive power, an object-side surface S8 of the fourth lens is a convex surface, an image-side surface S9 of the fourth lens is a concave surface, and both the object-side surface S8 and the image-side surface S9 of the fourth lens L4 are spherical surfaces.

The fifth lens L5 is a dual-convex lens having a positive refractive power, an object-side surface S9 of the fifth lens is a convex surface, an image-side surface S10 of the fifth lens is a convex surface, and both the object-side surface S9 and the image-side surface S10 of the fifth lens L5 are spherical surfaces.

The sixth lens L6 has a positive refractive power. The sixth lens L6 is a meniscus lens in an area near the optical axis, an object-side surface S11 of the sixth lens in the area near the optical axis is a convex surface, an image-side surface S12 of the sixth lens in the area near the optical axis is a concave surface, and both the object-side surface S11 and the image-side surface S12 of the sixth lens L6 are aspheric surfaces.

In this embodiment, the fourth lens L4 and the fifth lens L5 may be cemented to form a cemented lens.

Alternatively, the optical lens assembly may further include an optical filter L7 having an object-side surface S13 and an image-side surface S14 . The optical filter L7 may be

TABLE 6

| surface number | k | A4 | A6 | A8 | A10 | A12 | A14 | A16 |
|---|---|---|---|---|---|---|---|---|
| S3 | 0.4264 | 5.6800E−04 | 2.0497E−05 | 8.2951E−07 | 3.7069E−08 | 1.0775E−09 | −2.3718E−10 | 1.0165E−11 |
| S4 | −0.4938 | 1.1069E−04 | 2.5452E−05 | −2.0470E−06 | 1.4060E−07 | −5.0532E−09 | 8.7184E−11 | −3.9532E−13 |
| S6 | −0.6276 | −3.4482E−04 | 4.6950E−05 | −7.5882E−06 | 8.0466E−07 | −5.1978E−08 | 1.8440E−09 | −2.7109E−11 |
| S7 | 5.8682 | −5.3534E−04 | 1.9528E−05 | −1.1730E−06 | 1.6695E−07 | −1.4504E−08 | 6.4725E−10 | −1.1175E−11 |
| S11 | 38.1208 | −3.9098E−03 | −7.5357E−05 | 1.5832E−05 | −1.8066E−06 | 1.2560E−07 | −4.8543E−09 | 9.7846E−11 |
| S12 | −0.9884 | −3.3591E−03 | −2.5698E−04 | 5.8175E−05 | −6.2688E−06 | 3.7579E−07 | −1.1740E−08 | 1.4665E−10 | used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

In the optical lens assembly of this embodiment, the optical lens assembly may further include a diaphragm STO, and the diaphragm STO may be disposed between the second lens L2 and the third lens L3 to improve the imaging quality.

Table 7 shows a radius of curvature R, a thickness d/distance T (it should be understood that the thickness d/distance T in the row of S1 is a distance d1 from a center of the object-side surface of the first lens L1 to a center of the image-side surface of the first lens L1, and the thickness d/distance T in the row of S2 is a spacing distance T12 between the first lens L1 and the second lens L2, and so on), a refractive index Nd and an abbe number Vd of each lens of the optical lens assembly in Embodiment 4.

TABLE 7

| surface number | radius of curvature R (mm) | thickness d/distance T (mm) | material refractive index Nd | abbe number Vd |
|---|---|---|---|---|
| S1 | 10.4843 | 1.1000 | 1.52 | 64.21 |
| S2 | 4.3862 | 4.7000 | | |
| S3 | −5.5000 | 4.7600 | 1.81 | 41.00 |
| S4 | −8.1000 | 0.9000 | | |
| STO | infinite | −0.8000 | | |
| S6 | 7.5246 | 3.4500 | 1.62 | 63.44 |
| S7 | −27.2183 | 1.3700 | | |
| S8 | 12.2623 | 1.8100 | 1.85 | 23.79 |
| S9 | 4.4986 | 3.6000 | 1.44 | 94.58 |
| S10 | −22.3184 | 2.3400 | | |
| S11 | 15.0000 | 1.5000 | 1.68 | 31.09 |
| S12 | 15.3054 | 0.4000 | | |
| S13 | infinite | 0.5500 | 1.52 | 64.21 |
| S14 | infinite | 1.7978 | | |
| S15 | infinite | 0.5000 | 1.52 | 64.21 |
| S16 | infinite | 0.1250 | | |
| S17 | infinite | | | |

In Embodiment 4, the object-side surfaces and the image-side surfaces of the second lens L2, the third lens L3 and the sixth lens L6 may all be aspheric surfaces. The surface type x of each aspheric lens may be defined using, but not limited to, the formula (1) in Embodiment 1. Table 8 below gives the conic coefficient k and the high-order coefficients A4, A6, A8, A10, A12, A14 and A16 applicable to the aspheric surfaces S3, S4, S6, S7, S11 and S12 in Embodiment 4.

TABLE 8

| surface number | k | A4 | A6 | A8 | A10 | A12 | A14 | A16 |
|---|---|---|---|---|---|---|---|---|
| S3 | 0.3707 | 1.6262E−03 | −1.0214E−06 | 2.4007E−06 | −6.6746E−08 | 5.1540E−09 | −2.3718E−10 | 1.0165E−11 |
| S4 | −0.5374 | 1.2818E−04 | 2.7284E−05 | −2.3672E−06 | 1.3256E−07 | −3.8020E−09 | 3.8921E−11 | 1.5132E−13 |
| S6 | −0.9885 | −4.3948E−04 | 5.3335E−05 | −7.9089E−06 | 8.0490E−07 | −5.1228E−08 | 1.8092E−09 | −2.6795E−11 |
| S7 | 15.3563 | −5.8494E−04 | 2.3153E−05 | −1.1784E−06 | 1.5821E−07 | −1.4418E−08 | 6.5501E−10 | −1.1490E−11 |
| S11 | 3.1370 | −3.3855E−03 | −7.9241E−05 | 5.7579E−06 | −1.1122E−06 | 1.0027E−07 | −4.8543E−09 | 9.7846E−11 |
| S12 | −109.5068 | 3.9756E−04 | −6.4203E−04 | 8.0425E−05 | −7.0341E−06 | 3.8453E−07 | −1.1608E−08 | 1.4665E−10 |

Embodiment 5

Figure 6:
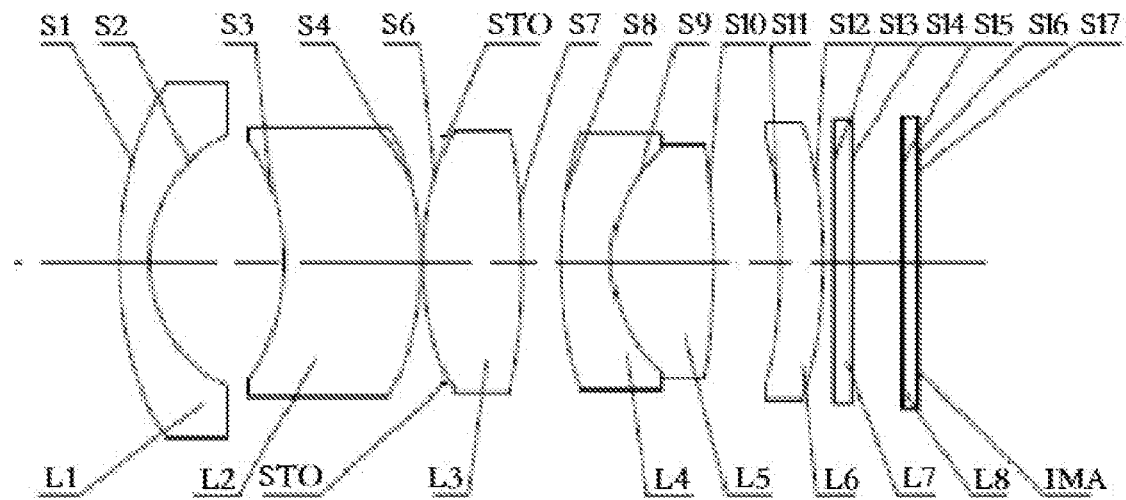
FIG. 6 is a schematic structural diagram of an optical lens assembly according to Embodiment 5 of the present disclosure.

An optical lens assembly according to Embodiment 5 of the present disclosure is described below with reference to FIG. 6. FIG. 6 is a schematic structural diagram of the optical lens assembly according to Embodiment 5 of the present disclosure.

As shown in FIG. 6, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a meniscus lens having a negative refractive power, an object-side surface S1 of the first lens is a convex surface, an image-side surface S2 of the first lens is a concave surface, and both the object-side surface S1 and the image-side surface S2 of the first lens L1 are spherical surfaces.

The second lens L2 is a meniscus lens having a negative refractive power, an object-side surface S3 of the second lens is a concave surface, an image-side surface S4 of the second lens is a convex surface, and both the object-side surface S3 and the image-side surface S4 of the second lens L2 are aspheric surfaces.

The third lens L3 is a dual-convex lens having a positive refractive power, an object-side surface S6 of the third lens is a convex surface, an image-side surface S7 of the third lens is a convex surface, and both the object-side surface S6 and the image-side surface S7 of the third lens L3 are aspheric surfaces.

The fourth lens L4 is a meniscus lens having a negative refractive power, an object-side surface S8 of the fourth lens is a convex surface, an image-side surface S9 of the fourth lens is a concave surface, and both the object-side surface S8 and the image-side surface S9 of the fourth lens L4 are spherical surfaces.

The fifth lens L5 is a dual-convex lens having a positive refractive power, an object-side surface S9 of the fifth lens is a convex surface, an image-side surface S10 of the fifth lens is a convex surface, and both the object-side surface S9 and the image-side surface S10 of the fifth lens L5 are spherical surfaces.

The sixth lens L6 has a positive refractive power. The sixth lens L6 is a meniscus lens in an area near the optical axis, an object-side surface S11 of the sixth lens in the area near the optical axis is a concave surface, an image-side surface S12 of the sixth lens in the area near the optical axis is a convex surface, and both the object-side surface S11 and the image-side surface S12 of the sixth lens L6 are aspheric surfaces.

In this embodiment, the fourth lens L4 and the fifth lens L5 may be cemented to form a cemented lens.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

In the optical lens assembly of this embodiment, the optical lens assembly may further include a diaphragm STO, and the diaphragm STO may be disposed between the second lens L2 and the third lens L3 to improve the imaging quality.

Table 9 shows a radius of curvature R, a thickness d/distance T (it should be understood that the thickness d/distance T in the row of S1 is a distance d1 from a center of the object-side surface of the first lens L1 to a center of the image-side surface of the first lens L1, and the thickness d/distance T in the row of S2 is a spacing distance T12 between the first lens L1 and the second lens L2, and so on), a refractive index Nd and an abbe number Vd of each lens of the optical lens assembly in Embodiment 5.

TABLE 9

| surface number | radius of curvature R (mm) | thickness d/distance T (mm) | material refractive index Nd | material abbe number Vd |
|---|---|---|---|---|
| S1 | 12.6000 | 1.0000 | 1.52 | 64.21 |
| S2 | 4.9400 | 5.1300 | | |
| S3 | −5.3500 | 4.4000 | 1.88 | 39.23 |
| S4 | −7.7600 | 0.9000 | | |
| STO | infinite | −0.8000 | | |
| S6 | 7.3000 | 3.9600 | 1.62 | 63.44 |
| S7 | −20.0000 | 1.3100 | | |
| S8 | 15.3000 | 0.9600 | 1.78 | 25.72 |
| S9 | 4.3600 | 3.6000 | 1.50 | 81.59 |
| S10 | −92.5000 | 2.5000 | | |
| S11 | −56.0000 | 1.7800 | 1.68 | 31.09 |
| S12 | −37.7000 | 0.4000 | | |
| S13 | infinite | 0.5500 | 1.52 | 64.21 |
| S14 | infinite | 1.7222 | | |
| S15 | infinite | 0.5000 | 1.52 | 64.21 |
| S16 | infinite | 0.1250 | | |
| S17 | infinite | | | |

In Embodiment 5, the object-side surfaces and the image-side surfaces of the first lens L1 and the sixth lens L6 may all be aspheric surfaces. The surface type x of each aspheric lens may be defined using, but not limited to, the formula (1) in Embodiment 1. Table 10 below gives the conic coefficient k and the high-order coefficients A4, A6, A8, A10, A12, A14 and A16 applicable to the aspheric surfaces S5, S6, S12 and S13 in Embodiment 5.

TABLE 10

| surface number | k | A4 | A6 | A8 | A10 | A12 | A14 | A16 |
|---|---|---|---|---|---|---|---|---|
| S3 | 0.2067 | 9.7620E−04 | −7.3680E−06 | 1.8282E−06 | −1.7100E−09 | 2.2278E−09 | −2.3718E−10 | 1.0165E−11 |
| S4 | −0.2916 | 4.7533E−05 | 2.1688E−05 | −1.9763E−06 | 1.3106E−07 | −4.6132E−09 | 7.7389E−11 | −3.9532E−13 |
| S6 | −0.8121 | −4.2963E−04 | 4.8386E−05 | −7.6460E−06 | 8.0836E−07 | −5.2229E−08 | 1.8441E−09 | −2.7109E−11 |
| S7 | −2.7707 | −4.5011E−04 | 1.4941E−05 | −1.1943E−06 | 1.7075E−07 | −1.4777E−08 | 6.4681E−10 | −1.1174E−11 |
| S11 | 198.0000 | −2.3481E−03 | −1.9084E−04 | 2.4280E−05 | −2.2643E−06 | 1.2560E−07 | −4.8543E−09 | 9.7846E−11 |
| S12 | −27.1595 | −1.3985E−03 | −4.2809E−04 | 7.1617E−05 | −6.9512E−06 | 3.8914E−07 | −1.1740E−08 | 1.4665E−10 |

Embodiment 6

Figure 7:
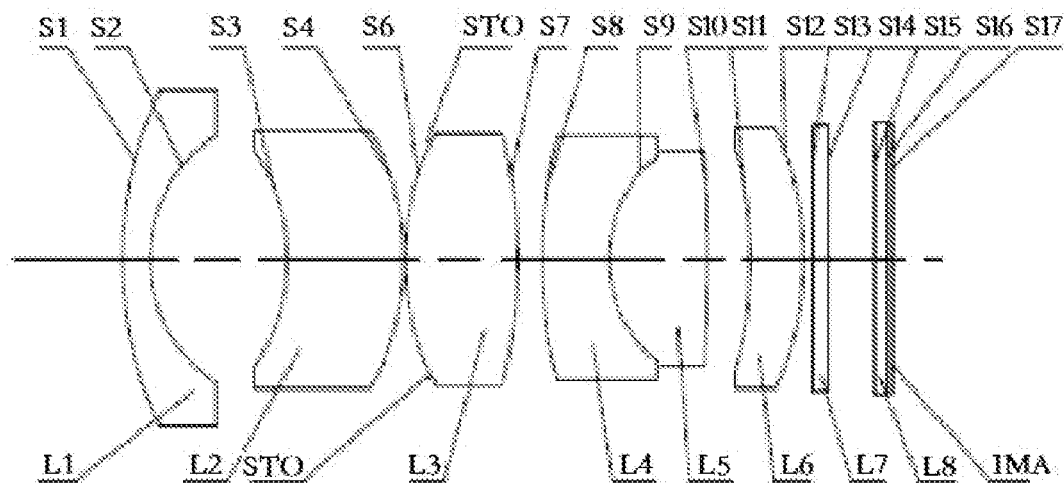
FIG. 7 is a schematic structural diagram of an optical lens assembly according to Embodiment 6 of the present disclosure.

An optical lens assembly according to Embodiment 6 of the present disclosure is described below with reference to FIG. 7. FIG. 7 is a schematic structural diagram of the optical lens assembly according to Embodiment 6 of the present disclosure.

As shown in FIG. 7, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a meniscus lens having a negative refractive power, an object-side surface S1 of the first lens is a convex surface, an image-side surface S2 of the first lens is a concave surface, and both the object-side surface S1 and the image-side surface S2 of the first lens L1 are spherical surfaces.

The second lens L2 is a meniscus lens having a negative refractive power, an object-side surface S3 of the second lens is a concave surface, an image-side surface S4 of the second lens is a convex surface, and both the object-side surface S3 and the image-side surface S4 of the second lens L2 are aspheric surfaces.

The third lens L3 is a dual-convex lens having a positive refractive power, an object-side surface S6 of the third lens is a convex surface, an image-side surface S7 of the third lens is a convex surface, and both the object-side surface S6 and the image-side surface S7 of the third lens L3 are aspheric surfaces.

The fourth lens L4 is a meniscus lens having a negative refractive power, an object-side surface S8 of the fourth lens is a convex surface, an image-side surface S9 of the fourth lens is a concave surface, and both the object-side surface S8 and the image-side surface S9 of the fourth lens L4 are spherical surfaces.

The fifth lens L5 is a dual-convex lens having a positive refractive power, an object-side surface S9 of the fifth lens is a convex surface, an image-side surface S10 of the fifth lens is a convex surface, and both the object-side surface S9 and the image-side surface S10 of the fifth lens L5 are spherical surfaces.

The sixth lens L6 has a positive refractive power. The sixth lens L6 is a dual-convex lens in an area near the optical axis, an object-side surface S11 of the sixth lens in the area near the optical axis is a convex surface, an image-side surface S12 of the sixth lens in the area near the optical axis is a convex surface, and both the object-side surface S11 and the image-side surface S12 of the sixth lens L6 are aspheric surfaces.

In this embodiment, the fourth lens L4 and the fifth lens L5 may be cemented to form a cemented lens.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

In the optical lens assembly of this embodiment, the optical lens assembly may further include a diaphragm STO, and the diaphragm STO may be disposed between the second lens L2 and the third lens L3 to improve the imaging quality.

Table 11 shows a radius of curvature R, a thickness d/distance T (it should be understood that the thickness d/distance T in the row of S1 is a distance d1 from a center of the object-side surface of the first lens L1 to a center of the image-side surface of the first lens L1, and the thickness d/distance T in the row of S2 is a spacing distance T12 between the first lens L1 and the second lens L2, and so on), a refractive index Nd and an abbe number Vd of each lens of the optical lens assembly in Embodiment 6.

TABLE 11

| surface number | radius of curvature R (mm) | thickness d/distance T (mm) | refractive index Nd | abbe number Vd |
|---|---|---|---|---|
| S1 | 11.7860 | 1.0228 | 1.52 | 64.21 |
| S2 | 4.6664 | 5.0750 | | |
| S3 | −5.2583 | 4.2765 | 1.88 | 39.2.3 |
| S4 | −7.5959 | 0.9000 | | |
| STO | infinite | −0.8000 | | |
| S6 | 7.4682 | 4.1488 | 1.62 | 63.44 |
| S7 | −19.5787 | 0.9329 | | |
| S8 | 15.3407 | 2.4995 | 1.85 | 23.79 |
| S9 | 4.1762 | 3.6000 | 1.50 | 81.59 |
| S10 | −75.3000 | 1.6114 | | |
| S11 | 92.6000 | 1.9493 | 1.68 | 31.09 |
| S12 | −88.8000 | 0.4000 | | |
| S13 | infinite | 0.5500 | 1.52 | 64.21 |
| S14 | infinite | 1.7179 | | |
| S15 | infinite | 0.5000 | 1.52 | 64.21 |
| S16 | infinite | 0.1250 | | |
| S17 | infinite | | | |

In Embodiment 6, the object-side surfaces and the image-side surfaces of the second lens L2, the third lens L3 and the sixth lens L6 may all be aspheric surfaces. The surface type x of each aspheric lens may be defined using, but not limited to, the formula (1) in Embodiment 1. Table 12 below gives the conic coefficient k and the high-order coefficients A4, A6, A8, A10, A12, A14 and A16 applicable to the aspheric surfaces S3, S4, S6, S7, S11 and S12 in Embodiment 6.

TABLE 12

| surface number | k | A4 | A6 | A8 | A10 | A12 | A14 | A16 |
|---|---|---|---|---|---|---|---|---|
| S3 | 0.1465 | 1.1449E−03 | −9.2654E−06 | 1.5519E−06 | 3.3334E−08 | 8.1115E−10 | −2.3718E−10 | 1.0165E−11 |
| S4 | −0.3680 | 8.0174E−05 | 2.1971E−05 | −2.0864E−06 | 1.3762E−07 | −4.7486E−09 | 7.7113E−11 | −3.9531E−13 |
| S6 | −0.9004 | −4.2978E−04 | 4.9612E−05 | −7.6999E−06 | 8.0848E−07 | −5.1979E−08 | 1.8366E−09 | −2.7109E−11 |
| S7 | 0.6772 | −5.1496E−04 | 2.1201E−05 | −1.5938E−06 | 1.9044E−07 | −1.5282E−08 | 6.5279E−10 | −1.1174E−11 |
| S11 | 97.2733 | −2.3856E−03 | −3.8903E−05 | −9.0747E−07 | −3.9772E−07 | 7.2600E−08 | −4.8543E−09 | 9.7846E−11 |
| S12 | 137.4811 | −1.4666E−03 | −2.4799E−04 | 4.5541E−05 | −5.1037E−06 | 3.2504E−07 | −1.0883E−08 | 1.4665E−10 |

Embodiment 7

Figure 8:
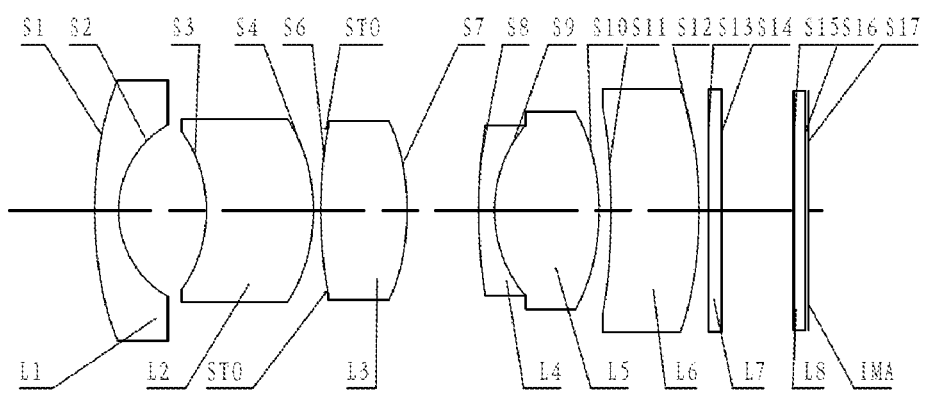
FIG. 8 is a schematic structural diagram of an optical lens assembly according to Embodiment 7 of the present disclosure.

An optical lens assembly according to Embodiment 7 of the present disclosure is described below with reference to FIG. 8. FIG. 8 is a schematic structural diagram of the optical lens assembly according to Embodiment 7 of the present disclosure.

As shown in FIG. 8, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a convex-concave lens having a negative refractive power, an object-side surface S1 of the first lens is a convex surface, and an image-side surface S2 of the first lens is a concave surface. The second lens L2 is a concave-convex lens having a positive refractive power, an object-side surface S3 of the second lens is a concave surface, and an image-side surface S4 of the second lens is a convex surface. The third lens L3 is a dual-convex lens having a positive refractive power, an object-side surface S6 of the third lens is a convex surface, and an image-side surface S7 of the third lens is a convex surface. The fourth lens L4 is a convex-concave lens having a negative refractive power, an object-side surface S8 of the fourth lens is a convex surface, and an image-side surface S9 of the fourth lens is a concave surface. The fifth lens L5 is a dual-convex lens having a positive refractive power, an object-side surface S9 of the fifth lens is a convex surface, and an image-side surface S10 of the fifth lens is a convex surface. The sixth lens L6 has a positive refractive power. The sixth lens L6 is a convex-concave lens in an area near the optical axis, i.e., an object-side surface S11 of the sixth lens in the area near the optical axis is a convex surface, and an image-side surface S12 of the sixth lens in the area near the optical axis is a concave surface. The fourth lens L4 and the fifth lens L5 may be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position between the second lens L2 and the third lens L3 near the object-side surface S6 of the third lens L3.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

Table 13 shows a radius of curvature R, a thickness/distance d (it should be understood that the thickness/distance d in the row of S1 is a center thickness d1 of the first lens L1 to a center of the image-side surface of the first lens L1, and the thickness/distance d in the row of S2 is a spacing distance d12 between the first lens L1 and the second lens L2, and so on), a refractive index Nd and an abbe number Vd of each lens of the optical lens assembly in Embodiment 7.

TABLE 13

| surface number | radius of curvature R (mm) | thickness d/distance T (mm) | refractive index Nd | abbe number Vd |
|---|---|---|---|---|
| S1 | 16.0000 | 1.0000 | 1.52 | 64.21 |
| S2 | 4.1882 | 3.7100 | | |
| S3 | −6.5170 | 4.5200 | 1.81 | 41.00 |
| S4 | −7.1338 | 0.5400 | | |
| STO | 无穷大 | −0.2200 | | |
| S6 | 15.8826 | 3.6400 | 1.62 | 63.88 |
| S7 | −10.6990 | 3.0300 | | |
| S8 | 23.0000 | 0.6600 | 1.85 | 23.79 |
| S9 | 5.5500 | 4.4200 | 1.50 | 81.59 |
| S10 | −9.1456 | 0.5000 | | |
| S11 | 76.7848 | 3.7200 | 1.74 | 49.34 |
| S12 | 84.4629 | 0.4000 | | |
| S13 | infinite | 0.5500 | 1.52 | 64.21 |
| S14 | infinite | 3.0410 | | |
| S15 | infinite | 0.5000 | 1.52 | 64.21 |
| S16 | infinite | 0.1250 | | |
| S17(IMA) | infinite | — | | |

In Embodiment 7, the object-side surface S3 and the image-side surface S4 of the second lens L2, the object-side surface S6 and the image-side surface S7 of the third lens L3, and the object-side surface S11 and the image-side surface S12 of the sixth lens L6 may all be aspheric surfaces. The surface type x of each aspheric lens may be defined using, but not limited to, the following aspheric formula:

$$x = \frac{ch^2}{1 + \sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 13 above); k is the conic coefficient; and Ai is the correction coefficient of an i-th order of the aspheric surface. Table 14 below gives the conic coefficient k and the high-order coefficients A4, A6, A8, A10, A12, A14 and A16 applicable to the aspheric surfaces S3, S4, S6, S7, S11 and S12 in Embodiment 7.

image side, a first lens L1, a second lens L2, a third lens L3, a fourth lens L4, a fifth lens L5 and a sixth lens L6.

The first lens L1 is a convex-concave lens having a negative refractive power, an object-side surface S1 of the first lens is a convex surface, and an image-side surface S2 of the first lens is a concave surface. The second lens L2 is a concave-convex lens having a positive refractive power, an object-side surface S3 of the second lens is a concave surface, and an image-side surface S4 of the second lens is a convex surface. The third lens L3 is a dual-convex lens having a positive refractive power, an object-side surface S6 of the third lens is a convex surface, and an image-side surface S7 of the third lens is a convex surface. The fourth lens L4 is a convex-concave lens having a negative refractive power, an object-side surface S8 of the fourth lens is a convex surface, and an image-side surface S9 of the fourth lens is a concave surface. The fifth lens L5 is a dual-convex lens having a positive refractive power, an object-side surface S9 of the fifth lens is a convex surface, and an image-side surface S10 of the fifth lens is a convex surface. The sixth lens L6 has a positive refractive power. The sixth lens L6 is a dual-convex lens in an area near the optical axis, i.e., an object-side surface S11 of the sixth lens in the area near the optical axis is a convex surface, and an image-side surface S12 of the sixth lens in the area near the optical axis is a convex surface. The fourth lens L4 and the fifth lens L5 may be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position between the second lens L2 and the third lens L3 near the object-side surface S6 of the third lens L3.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object

TABLE 14

| surface number | k | A4 | A6 | A8 | A10 | A12 | A14 | A16 |
|---|---|---|---|---|---|---|---|---|
| S3 | −3.9876 | −2.9052E−03 | 3.4795E−05 | 4.7775E−07 | −4.1788E−07 | 3.8730E−08 | −8.6540E−10 | −1.1754E−11 |
| S4 | −0.5574 | −4.7027E−04 | 4.3073E−05 | −1.0122E−06 | −9.2241E−08 | 6.2329E−09 | 1.1447E−11 | −4.3644E−12 |
| S6 | 1.8806 | −9.4189E−04 | 7.1305E−05 | −4.8884E−06 | 1.0501E−07 | 9.1398E−09 | −9.1903E−10 | 2.8185E−11 |
| S7 | 2.6053 | −1.5939E−04 | 1.3047E−06 | 1.3194E−06 | −7.7374E−08 | −1.5304E−09 | 3.9869E−10 | −1.2536E−11 |
| S11 | 155.0000 | −1.4384E−03 | 1.3451E−05 | −2.1931E−06 | 1.7558E−07 | −5.8845E−09 | −2.3347E−12 | 3.3699E−12 |
| S12 | 136.8510 | −1.6261E−03 | 8.3345E−06 | 1.0503E−07 | −5.1722E−09 | 2.0109E−10 | −1.4409E−11 | 3.1865E−13 |

Embodiment 8

Figure 9:
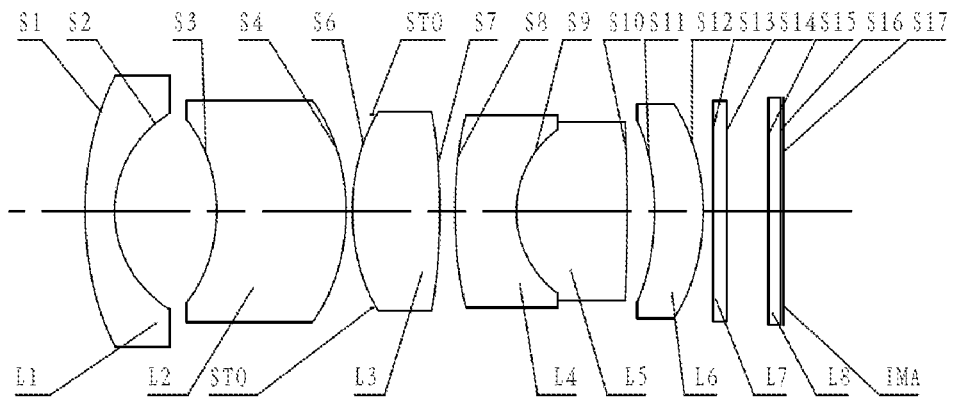
FIG. 9 is a schematic structural diagram of an optical lens assembly according to Embodiment 8 of the present disclosure.

An optical lens assembly according to Embodiment 8 of the present disclosure is described below with reference to FIG. 9. In this and the following embodiments, part of the description similar to that of Embodiment 7 will be omitted for the sake of brevity. FIG. 9 is a schematic structural diagram of the optical lens assembly according to Embodiment 8 of the present disclosure.

As shown in FIG. 9, the optical lens assembly includes, sequentially along an optical axis from an object side to an image side, sequentially passes through the surfaces S1-S16 and finally forms an image on the image plane S17.

Table 15 shows a radius of curvature R, a thickness/distance d, a refractive index Nd and an abbe number Vd of each lens of the optical lens assembly in Embodiment 8. Table 16 shows the conic coefficient and the high-order coefficients applicable to the aspheric surfaces in Embodiment 8. Here, the surface type of each aspheric surface may be defined using the formula (1) given in above Embodiment 7.

TABLE 15

| surface number | radius of curvature R (mm) | thickness d/distance T (mm) | refractive index Nd | abbe number Vd |
|---|---|---|---|---|
| S1 | 13.0106 | 1.2000 | 1.52 | 64.21 |
| S2 | 4.6823 | 4.1640 | | |
| S3 | −6.2120 | 5.2857 | 1.88 | 39.23 |
| S4 | −7.3464 | 1.0524 | | |
| STO | infinite | −0.8000 | | |
| S6 | 8.0464 | 3.5659 | 1.62 | 63.44 |
| S7 | −33.7204 | 0.6226 | | |
| S8 | 17.4473 | 2.5000 | 1.85 | 23.79 |
| S9 | 4.1592 | 4.5244 | 1.50 | 81.59 |
| S10 | −75.0000 | 1.1151 | | |
| S11 | 98.0000 | 1.9857 | 1.68 | 31.09 |
| S12 | −86.0000 | 0.4000 | | |
| S13 | infinite | 0.5500 | 1.52 | 64.21 |
| S14 | infinite | 1.7086 | | |
| S15 | infinite | 0.5000 | 1.52 | 64.21 |
| S16 | infinite | 0.1250 | | |
| S17(IMA) | infinite | — | | |

TABLE 16

| surface number | k | A4 | A6 | A8 | A10 | A12 | A14 | A16 |
|---|---|---|---|---|---|---|---|---|
| S3 | 0.7485 | 3.0707E−04 | 1.9789E−05 | 3.6955E−07 | 7.2954E−08 | 1.7549E−09 | −2.3718E−10 | 1.0165E−11 |
| S4 | −0.3659 | 8.4171E−05 | 2.1687E−05 | −2.0070E−06 | 1.3099E−07 | −4.7212E−09 | 9.4125E−11 | −8.1406E−13 |
| S6 | −0.3621 | −2.7111E−04 | 4.9174E−05 | −7.6760E−06 | 8.1391E−07 | −5.2065E−08 | 1.8475E−09 | −2.7109E−11 |
| S7 | 13.1555 | −7.7000E−04 | 3.5107E−05 | −1.6375E−06 | 1.7813E−07 | −1.3856E−08 | 6.3232E−10 | −1.1174E−11 |
| S11 | 52.2501 | −3.1051E−03 | −4.1085E−05 | −1.4650E−06 | −4.5232E−07 | 7.6000E−08 | −4.8543E−09 | 9.7846E−11 |
| S12 | 14.2380 | −2.1774E−03 | −2.3236E−04 | 4.4864E−05 | −5.0794E−06 | 3.2486E−07 | −1.0883E−08 | 1.4665E−10 |

Embodiment 9

Figure 10:
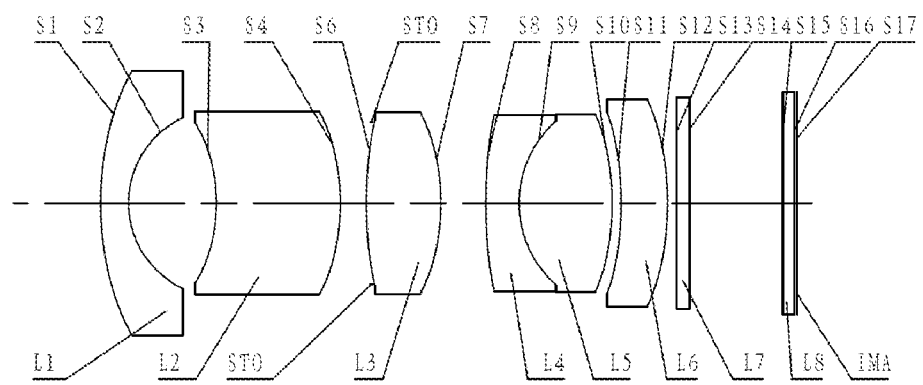
FIG. 10 is a schematic structural diagram of an optical lens assembly according to Embodiment 9 of the present disclosure.

An optical lens assembly according to Embodiment 9 of the present disclosure is described below with reference to FIG. 10. FIG. 10 is a schematic structural diagram of the optical lens assembly according to Embodiment 9 of the present disclosure.

As shown in FIG. 10, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a convex-concave lens having a negative refractive power, an object-side surface S1 of the first lens is a convex surface, and an image-side surface S2 of the first lens is a concave surface. The second lens L2 is a concave-convex lens having a positive refractive power, an object-side surface S3 of the second lens is a concave surface, and an image-side surface S4 of the second lens is a convex surface. The third lens L3 is a dual-convex lens having a positive refractive power, an object-side surface S6 of the third lens is a convex surface, and an image-side surface S7 of the third lens is a convex surface. The fourth lens L4 is a convex-concave lens having a negative refractive power, an object-side surface S8 of the fourth lens is a convex surface, and an image-side surface S9 of the fourth lens is a concave surface. The fifth lens L5 is a dual-convex lens having a positive refractive power, an object-side surface S9 of the fifth lens is a convex surface, and an image-side surface S10 of the fifth lens is a convex surface. The sixth lens L6 has a positive refractive power. The sixth lens L6 is a concave-convex lens in an area near the optical axis, i.e., an object-side surface S11 of the sixth lens in the area near the optical axis is a concave surface, and an image-side surface S12 of the sixth lens in the area near the optical axis is a convex surface. The fourth lens L4 and the fifth lens L5 may be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position between the second lens L2 and the third lens L3 near the object-side surface S6 of the third lens L3.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

Table 17 shows a radius of curvature R, a thickness/distance d, a refractive index Nd and an abbe number Vd of each lens of the optical lens assembly in Embodiment 9. Table 18 shows the conic coefficient and the high-order coefficients applicable to the aspheric surfaces in Embodiment 9. Here, the surface type of each aspheric surface may be defined using the formula (1) given in above Embodiment 7.

TABLE 17

| surface number | radius of curvature R (mm) | thickness d/distance T (mm) | refractive index Nd | abbe number Vd |
|---|---|---|---|---|
| S1 | 12.6667 | 1.2000 | 1.77 | 49.61 |
| S2 | 4.0565 | 3.7800 | | |
| S3 | −7.2303 | 5.3300 | 1.90 | 31.32 |
| S4 | −7.8040 | 1.3500 | | |
| STO | infinite | −0.2200 | | |
| S6 | 16.6564 | 3.2000 | 1.62 | 63.44 |
| S7 | −10.3089 | 1.9400 | | |
| S8 | 20.0479 | 1.4300 | 1.85 | 23.79 |
| S9 | 4.7118 | 4.0000 | 1.50 | 81.59 |
| S10 | −10.5082 | 0.3900 | | |
| S11 | −89.0318 | 2.0000 | 1.81 | 41.00 |
| S12 | −74.1931 | 0.4000 | | |
| S13 | infinite | 0.5500 | 1.52 | 64.21 |
| S14 | infinite | 4.0118 | | |
| S15 | infinite | 0.5000 | 1.52 | 64.21 |
| S16 | infinite | 0.1250 | | |
| S17(IMA) | infinite | — | | |

TABLE 18

| surface number | k | A4 | A6 | A8 | A10 | A12 | A14 | A16 |
|---|---|---|---|---|---|---|---|---|
| S3 | −3.0062 | −1.4662E−03 | 5.8853E−06 | 3.9979E−06 | −5.6446E−07 | 3.8730E−08 | −8.6540E−10 | −1.1754E−11 |
| S4 | −3.9717 | −2.8422E−04 | −9.7764E−06 | 2.4388E−06 | −1.7363E−07 | 6.2329E−09 | 1.1447E−11 | −4.3644E−12 |
| S6 | 6.7288 | 1.6634E−04 | −5.0148E−05 | 1.6429E−06 | −8.1936E−08 | 9.1398E−09 | −9.1903E−10 | 2.8185E−11 |
| S7 | −1.0585 | −6.0818E−04 | −1.1180E−06 | 9.8696E−07 | −9.4588E−08 | −1.5304E−09 | 3.9869E−10 | −1.2536E−11 |
| S11 | −53.6239 | −2.2722E−03 | 6.4338E−06 | −1.7477E−06 | 1.7664E−07 | −5.8845E−09 | −2.3347E−12 | 3.3699E−12 |
| S12 | 199.0000 | −2.1440E−03 | 2.2546E−05 | −3.0123E−07 | 1.2450E−08 | −2.5322E−10 | −1.4409E−11 | 3.1865E−13 |

Embodiment 10

Figure 11:
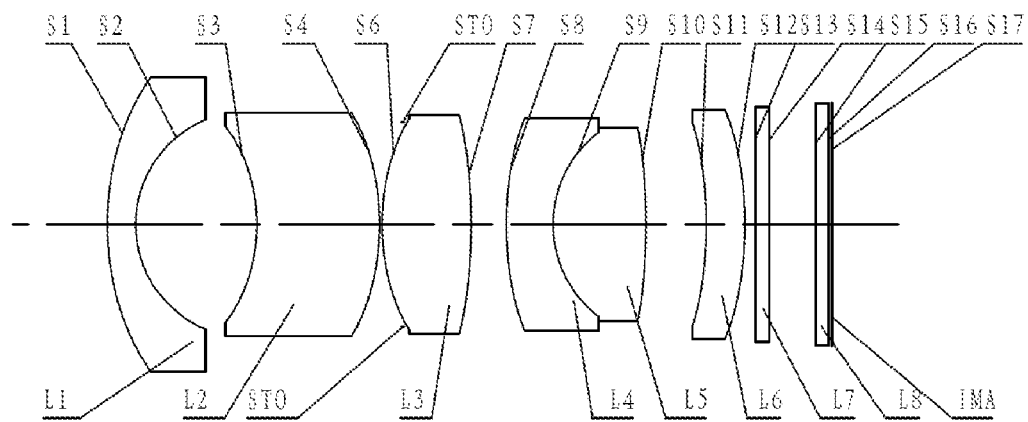
FIG. 11 is a schematic structural diagram of an optical lens assembly according to Embodiment 10 of the present disclosure.

An optical lens assembly according to Embodiment 10 of the present disclosure is described below with reference to FIG. 11. FIG. 11 is a schematic structural diagram of the optical lens assembly according to Embodiment 10 of the present disclosure.

As shown in FIG. 11, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a convex-concave lens having a negative refractive power, an object-side surface S1 of the first lens is a convex surface, and an image-side surface S2 of the first lens is a concave surface. The second lens L2 is a concave-convex lens having a negative refractive power, an object-side surface S3 of the second lens is a concave surface, and an image-side surface S4 of the second lens is a convex surface. The third lens L3 is a dual-convex lens having a positive refractive power, an object-side surface S6 of the third lens is a convex surface, and an image-side surface S7 of the third lens is a convex surface. The fourth lens L4 is a convex-concave lens having a negative refractive power, an object-side surface S8 of the fourth lens is a convex surface, and an image-side surface S9 of the fourth lens is a concave surface. The fifth lens L5 is a dual-convex lens having a positive refractive power, an object-side surface S9 of the fifth lens is a convex surface, and an image-side surface S10 of the fifth lens is a convex surface. The sixth lens L6 has a positive refractive power. The sixth lens L6 is a convex-concave lens in an area near the optical axis, i.e., an object-side surface S11 of the sixth lens in the area near the optical axis is a convex surface, and an image-side surface S12 of the sixth lens in the area near the optical axis is a concave surface. The fourth lens L4 and the fifth lens L5 may be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position between the second lens L2 and the third lens L3 near the object-side surface S6 of the third lens L3.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

Table 19 shows a radius of curvature R, a thickness/distance d, a refractive index Nd and an abbe number Vd of each lens of the optical lens assembly in Embodiment 10. Table 20 shows the conic coefficient and the high-order coefficients applicable to the aspheric surfaces in Embodiment 10. Here, the surface type of each aspheric surface may be defined using the formula (1) given in above Embodiment 7.

TABLE 19

| surface number | radius of curvature R (mm) | thickness d/distance T (mm) | refractive index Nd | abbe number Vd |
|---|---|---|---|---|
| S1 | 10.4843 | 1.1000 | 1.52 | 64.21 |
| S2 | 4.3862 | 4.7000 | | |
| S3 | −5.5000 | 4.7600 | 1.81 | 41.00 |
| S4 | −8.1000 | 0.9000 | | |
| STO | infinite | −0.8000 | | |
| S6 | 7.5246 | 3.4500 | 1.62 | 63.44 |
| S7 | −27.2183 | 1.3700 | | |
| S8 | 12.2623 | 1.8100 | 1.85 | 23.79 |
| S9 | 4.4986 | 3.6000 | 1.44 | 94.58 |
| S10 | −22.3184 | 2.3400 | | |
| S11 | 15.0000 | 1.5000 | 1.68 | 31.09 |
| S12 | 15.3054 | 0.4000 | | |
| S13 | infinite | 0.5500 | 1.52 | 64.2.1 |
| S14 | infinite | 1.7978 | | |
| S15 | infinite | 0.5000 | 1.52 | 64.21 |
| S16 | infinite | 0.1250 | | |
| S17(IMA) | infinite | — | | |

TABLE 20

| surface number | k | A4 | A6 | A8 | A10 | A12 | A14 | A16 |
|---|---|---|---|---|---|---|---|---|
| S3 | 0.3707 | 1.6262E−03 | −1.0214E−06 | 2.4007E−06 | −6.6746E−08 | 5.1540E−09 | −2.3718E−10 | 1.0165E−11 |
| S4 | −0.5374 | 1.2818E−04 | 2.7284E−05 | −2.3672E−06 | 1.3256E−07 | −3.8020E−09 | 3.8921E−11 | 1.5132E−13 |
| S6 | −0.9885 | −4.3948E−04 | 5.3335E−05 | −7.9089E−06 | 8.0490E−07 | −5.1228E−08 | 1.8092E−09 | −2.6795E−11 |
| S7 | 15.3563 | −5.8494E−04 | 2.3153E−05 | −1.1784E−06 | 1.5821E−07 | −1.4418E−08 | 6.5501E−10 | −1.1490E−11 |
| S11 | 3.1370 | −3.3855E−03 | −7.9241E−05 | 5.7579E−06 | −1.1122E−06 | 1.0027E−07 | −4.8543E−09 | 9.7846E−11 |
| S12 | −109.5068 | 3.9756E−04 | −6.4203E−04 | 8.0425E−05 | −7.0341E−06 | 3.8453E−07 | −1.1608E−08 | 1.4665E−10 |

Embodiment 11

Figure 12:
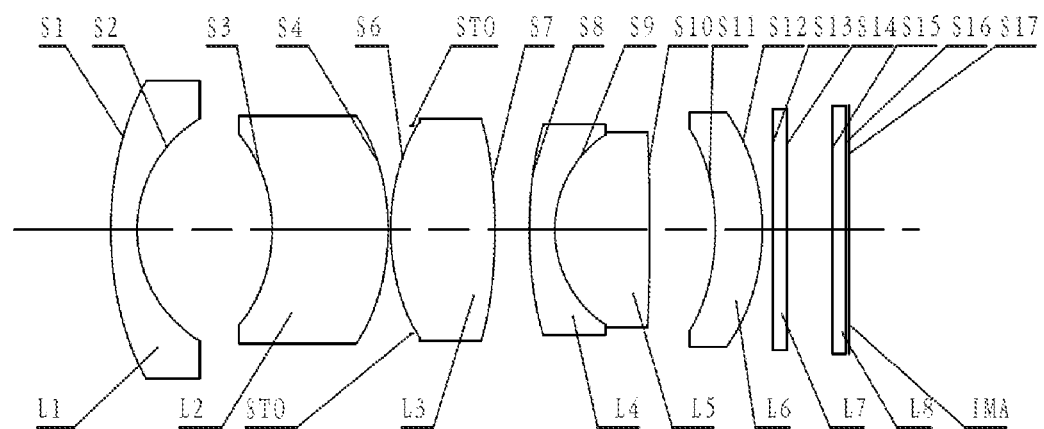
FIG. 12 is a schematic structural diagram of an optical lens assembly according to Embodiment 11 of the present disclosure.

An optical lens assembly according to Embodiment 11 of the present disclosure is described below with reference to FIG. 12. FIG. 12 is a schematic structural diagram of the optical lens assembly according to Embodiment 11 of the present disclosure.

As shown in FIG. 12, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a convex-concave lens having a negative refractive power, an object-side surface S1 of the first lens is a convex surface, and an image-side surface S2 of the first lens is a concave surface. The second lens L2 is a concave-convex lens having a negative refractive power, an object-side surface S3 of the second lens is a concave surface, and an image-side surface S4 of the second lens is a convex surface. The third lens L3 is a dual-convex lens having a positive refractive power, an object-side surface S6 of the third lens is a convex surface, and an image-side surface S7 of the third lens is a convex surface. The fourth lens L4 is a convex-concave lens having a negative refractive power, an object-side surface S8 of the fourth lens is a convex surface, and an image-side surface S9 of the fourth lens is a concave surface. The fifth lens L5 is a dual-convex lens having a positive refractive power, an object-side surface S9 of the fifth lens is a convex surface, and an image-side surface S10 of the fifth lens is a convex surface. The sixth lens L6 has a positive refractive power. The sixth lens L6 is a concave-convex lens in an area near the optical axis, i.e., an object-side surface S11 of the sixth lens in the area near the optical axis is a concave surface, and an image-side surface S12 of the sixth lens in the area near the optical axis is a convex surface. The fourth lens L4 and the fifth lens L5 may be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position between the second lens L2 and the third lens L3 near the object-side surface S6 of the third lens L3.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

Table 21 shows a radius of curvature R, a thickness/distance d, a refractive index Nd and an abbe number Vd of each lens of the optical lens assembly in Embodiment 11. Table 22 shows the conic coefficient and the high-order coefficients applicable to the aspheric surfaces in Embodiment 11. Here, the surface type of each aspheric surface may be defined using the formula (1) given in above Embodiment 7.

TABLE 21

| surface number | radius of curvature R (mm) | thickness d/distance T (mm) | refractive index Nd | abbe number Vd |
|---|---|---|---|---|
| S1 | 12.6000 | 1.0000 | 1.52 | 64.21 |
| S2 | 4.9400 | 5.1300 | | |
| S3 | −5.3500 | 4.4000 | 1.88 | 39.23 |
| S4 | −7.7600 | 0.9000 | | |
| STO | infinite | −0.8000 | | |
| S6 | 7.3000 | 3.9600 | 1.62 | 63.44 |
| S7 | −20.0000 | 1.3100 | | |
| S8 | 15.3000 | 0.9600 | 1.78 | 25.72 |
| S9 | 4.3600 | 3.6000 | 1.50 | 81.59 |
| S10 | −92.5000 | 2.5000 | | |
| S11 | −56.0000 | 1.7800 | 1.68 | 31.09 |
| S12 | −37.7000 | 0.4000 | | |
| S13 | infinite | 0.5500 | 1.52 | 64.21 |
| S14 | infinite | 1.7222 | | |
| S15 | infinite | 0.5000 | 1.52 | 64.21 |
| S16 | infinite | 0.1250 | | |
| S17(IMA) | infinite | — | | |

TABLE 22

| surface number | k | A4 | A6 | A8 | A10 | A12 | A14 | A16 |
|---|---|---|---|---|---|---|---|---|
| S3 | 0.2067 | 9.7620E−04 | −7.3680E−06 | 1.8282E−06 | −1.7100E−09 | 2.2278E−09 | −2.3718E−10 | 1.0165E−11 |
| S4 | −0.2916 | 4.7533E−05 | 2.1688E−05 | −1.9763E−06 | 1.3106E−07 | −4.6132E−09 | 7.7389E−11 | −3.9532E−13 |
| S6 | −0.8121 | −4.2963E−04 | 4.8386E−05 | −7.6460E−06 | 8.0836E−07 | −5.2229E−08 | 1.8441E−09 | −2.7109E−11 |
| S7 | −2.7707 | −4.5011E−04 | 1.4941E−05 | −1.1943E−06 | 1.7075E−07 | −1.4777E−08 | 6.4681E−10 | −1.1174E−11 |
| S11 | 198.0000 | −2.3481E−03 | −1.9084E−04 | 2.4280E−05 | −2.2643E−06 | 1.2560E−07 | −4.8543E−09 | 9.7846E−11 |
| S12 | −27.1595 | −1.3985E−03 | −4.2809E−04 | 7.1617E−05 | −6.9512E−06 | 3.8914E−07 | −1.1740E−08 | 1.4665E−10 |

Embodiment 12

Figure 13:
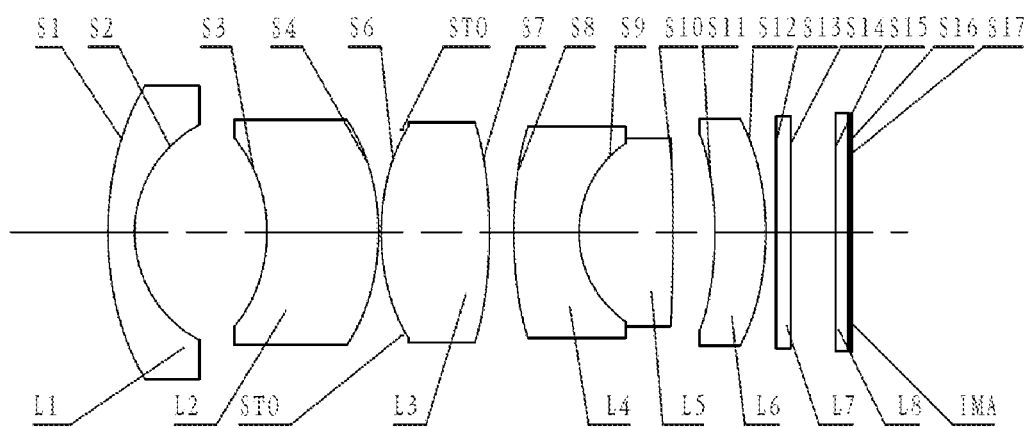
FIG. 13 is a schematic structural diagram of an optical lens assembly according to Embodiment 12 of the present disclosure.

An optical lens assembly according to Embodiment 12 of the present disclosure is described below with reference to FIG. 13. FIG. 13 is a schematic structural diagram of the optical lens assembly according to Embodiment 12 of the present disclosure.

As shown in FIG. 13, the optical lens assembly includes, sequentially along an optical axis from an object side to an image side, a first lens L1, a second lens L2, a third lens L3, a fourth lens L4, a fifth lens L5 and a sixth lens L6.

The first lens L1 is a convex-concave lens having a negative refractive power, an object-side surface S1 of the first lens is a convex surface, and an image-side surface S2 of the first lens is a concave surface. The second lens L2 is a concave-convex lens having a negative refractive power, an object-side surface S3 of the second lens is a concave surface, and an image-side surface S4 of the second lens is a convex surface. The third lens L3 is a dual-convex lens having a positive refractive power, an object-side surface S6 of the third lens is a convex surface, and an image-side surface S7 of the third lens is a convex surface. The fourth lens L4 is a convex-concave lens having a negative refractive power, an object-side surface S8 of the fourth lens is a convex surface, and an image-side surface S9 of the fourth lens is a concave surface. The fifth lens L5 is a dual-convex lens having a positive refractive power, an object-side surface S9 of the fifth lens is a convex surface, and an image-side surface S10 of the fifth lens is a convex surface. The sixth lens L6 has a positive refractive power. The sixth lens L6 is a dual-convex lens in an area near the optical axis, i.e., an object-side surface S11 of the sixth lens in the area near the optical axis is a convex surface, and an image-side surface S12 of the sixth lens in the area near the optical axis is a convex surface. The fourth lens L4 and the fifth lens L5 may be cemented to form a cemented lens.

The optical lens assembly may further include a diaphragm STO, and the diaphragm STO may be disposed between the second lens L2 and the third lens L3 to improve the imaging quality. For example, the diaphragm STO may be disposed at a position between the second lens L2 and the third lens L3 near the object-side surface S6 of the third lens L3.

Alternatively, the optical lens assembly may further include an optical filter L7 having an object-side surface S13 and an image-side surface S14. The optical filter L7 may be used to correct color deviations. The optical lens assembly may further include a protective glass L8 having an object-side surface S15 and an image-side surface S16. The protective glass L8 may be used to protect an image sensing chip IMA at an image plane S17. Light from an object sequentially passes through the surfaces S1-S16 and finally forms an image on the image plane S17.

Table 23 shows a radius of curvature R, a thickness/distance d, a refractive index Nd and an abbe number Vd of each lens of the optical lens assembly in Embodiment 12.

Table 24 shows the conic coefficient and the high-order coefficients applicable to the aspheric surfaces in Embodiment 12. Here, the surface type of each aspheric surface may be defined using the formula (1) given in above Embodiment 7.

TABLE 23

| surface number | radius of curvature R (mm) | thickness d/distance T (mm) | refractive index Nd | abbe number Vd |
|---|---|---|---|---|
| S1 | 11.7860 | 1.0228 | 1.52 | 64.21 |
| S2 | 4.6664 | 5.0750 | | |
| S3 | −5.2583 | 4.2765 | 1.88 | 39.23 |
| S4 | −7.5959 | 0.9000 | | |
| STO | infinite | −0.8000 | | |
| S6 | 7.4682 | 4.1488 | 1.62 | 63.44 |
| S7 | −19.5787 | 0.9329 | | |
| S8 | 15.3407 | 2.4995 | 1.85 | 23.79 |
| S9 | 4.1762 | 3.6000 | 1.50 | 81.59 |
| S10 | −75.3000 | 1.6114 | | |
| S11 | 92.6000 | 1.9493 | 1.68 | 31.09 |
| S12 | −88.8000 | 0.4000 | | |
| S13 | infinite | 0.5500 | 1.52 | 64.21 |
| S14 | infinite | 1.7179 | | |
| S15 | infinite | 0.5000 | 1.52 | 64.21 |
| S16 | infinite | 0.1250 | | |
| S17(IMA) | infinite | — | | |

TABLE 24

| surface number | k | A4 | A6 | A8 | A10 | A12 | A14 | A16 |
|---|---|---|---|---|---|---|---|---|
| S3 | 0.1465 | 1.1449E−03 | −9.2654E−06 | 1.5519E−06 | 3.3334E−08 | 8.1115E−10 | −2.3718E−10 | 1.0165E−11 |
| S4 | −0.3680 | 8.0174E−05 | 2.1971E−05 | −2.0864E−06 | 1.3762E−07 | −4.7486E−09 | 7.7113E−11 | −3.9531E−13 |
| S6 | −0.9004 | −4.2978E−04 | 4.9612E−05 | −7.6999E−06 | 8.0848E−07 | −5.1979E−08 | 1.8366E−09 | −2.7109E−11 |
| S7 | 0.6772 | −5.1496E−04 | 2.1201E−05 | −1.5938E−06 | 1.9044E−07 | −1.5282E−08 | 6.5279E−10 | −1.1174E−11 |
| S11 | 97.2733 | −2.3856E−03 | −3.8903E−05 | −9.0747E−07 | −3.9772E−07 | 7.2600E−08 | −4.8543E−09 | 9.7846E−11 |
| S12 | 137.4811 | −1.4666E−03 | −2.4799E−04 | 4.5541E−05 | −5.1037E−06 | 3.2504E−07 | −1.0883E−08 | 1.4665E−10 |

In summary, Embodiments 1-6 satisfy the relationships shown in Table 25. In Table 19, the units of TTL, BFL, F, D, H, F4, F5, F6, d1, d2, d56, R11, R12, R21, R22, D41, R41 and SAG41 are millimeters (mm), and the unit of FOV is degrees (°).

TABLE 25

| conditional expression/embodiment | 1 | 2 | 3 | 4 | 5 | 6 |
|---|---|---|---|---|---|---|
| TTL | 27.9900 | 27.7996 | 28.3257 | 28.1028 | 28.0372 | 28.5091 |
| F | 6.5951 | 6.6632 | 6.6698 | 6.4857 | 6.5212 | 6.4846 |
| H | 4.6390 | 4.6240 | 4.5860 | 4.6480 | 4.6120 | 4.6370 |
| FOV | 40 | 40 | 40 | 40 | 40 | 40 |
| D | 5.5818 | 5.8221 | 5.7539 | 5.7023 | 5.6682 | 5.6313 |
| BFL | 3.3200 | 2.9324 | 3.8658 | 3.3728 | 3.2972 | 3.2929 |
| F6 | −24.8716 | −24.2220 | −39.6796 | 364.3552 | 161.4118 | 66.2257 |
| F4 | −13.9803 | −11.1783 | −8.2977 | −9.3103 | −8.0106 | −7.4834 |
| F5 | 8.6966 | 7.9372 | 7.5591 | 8.8944 | 8.4579 | 8.0596 |
| d1 | 1.1000 | 1.1500 | 1.0017 | 1.1000 | 1.0000 | 1.0228 |
| d2 | 4.0000 | 4.5400 | 4.6000 | 4.7600 | 4.4000 | 4.2765 |
| d56 | 2.3100 | 1.1902 | 2.3000 | 2.3400 | 2.5000 | 1.6114 |
| SAG41 | 0.7252 | 0.8289 | 0.5867 | 0.7090 | 0.5334 | 0.5469 |
| D41 | 3.6800 | 4.0994 | 4.2586 | 4.1092 | 4.0045 | 4.0597 |
| R41 | 9.7000 | 10.5519 | 15.7482 | 12.2623 | 15.3000 | 15.3407 |
| R21 | −5.0868 | −5.7000 | −5.8500 | −5.5000 | −5.3500 | −5.2583 |
| R22 | −8.3283 | −8.0000 | −8.1200 | −8.1000 | −7.7600 | −7.5959 |
| R11 | 10.3300 | 10.5831 | 11.7190 | 10.4843 | 12.6000 | 11.7860 |
| R12 | 4.3821 | 4.7600 | 4.7094 | 4.3862 | 4.9400 | 4.6664 |

TABLE 25-continued

| conditional expression/embodiment | 1 | 2 | 3 | 4 | 5 | 6 |
|---|---|---|---|---|---|---|
| TTL/F | 4.244 | 4.172 | 4.247 | 4.333 | 4.299 | 4.396 |
| TTL/H/FOV | 0.151 | 0.150 | 0.154 | 0.151 | 0.152 | 0.154 |
| D/H/FOV | 0.030 | 0.031 | 0.031 | 0.031 | 0.031 | 0.030 |
| BFL/TTL | 0.119 | 0.105 | 0.136 | 0.120 | 0.118 | 0.116 |
| |F5/F4| | 0.622 | 0.710 | 0.911 | 0.955 | 1.056 | 1.077 |
| |F6/F| | 3.771 | 3.635 | 5.949 | 56.178 | 24.752 | 10.213 |
| d2/TTL | 0.143 | 0.163 | 0.162 | 0.169 | 0.157 | 0.150 |
| d56/TTL | 0.083 | 0.043 | 0.081 | 0.083 | 0.089 | 0.057 |
| (|R21| + d2)/|R22| | 1.091 | 1.280 | 1.287 | 1.267 | 1.256 | 1.255 |
| (FOV × F)/H | 56.866 | 57.640 | 58.175 | 55.815 | 56.558 | 55.938 |
| R11/(R12 + d1) | 1.884 | 1.791 | 2.052 | 1.911 | 2.121 | 2.072 |
| arctan(D41/(R41-SAG41)) | 0.389 | 0.399 | 0.274 | 0.342 | 0.265 | 0.268 |

In summary, Embodiments 7-12 respectively satisfy the relationships shown in the following Table 26. In Table 20, the units of TTL, F, H, D, BFL, F6, F4, F5, d1, d6, d56, SAG41, SAG21, SAG22, D41, D21, D22, R41, R11, R12 are millimeters (mm), and the unit of FOV is degrees (°).

TABLE 26

| conditional expression/embodiment | 7 | 8 | 9 | 10 | 11 | 12 |
|---|---|---|---|---|---|---|
| TTL | 30.1360 | 28.4994 | 29.9868 | 28.1028 | 28.0372 | 28.5091 |
| F | 5.2314 | 6.5414 | 5.0923 | 6.4857 | 6.5212 | 6.4846 |
| H | 5.0850 | 4.6330 | 4.8030 | 4.6480 | 4.6120 | 4.6370 |
| FOV | 61 | 40 | 56 | 40 | 40 | 40 |
| D | 5.5076 | 5.5491 | 5.6949 | 5.7023 | 5.6682 | 5.6313 |
| BFL | 4.6160 | 3.2836 | 5.5868 | 3.3728 | 3.2972 | 3.2929 |
| F6 | 943.7901 | 66.9198 | 518.4012 | 364.3552 | 161.4118 | 66.2257 |
| F4 | −8.7070 | −6.9931 | −7.5271 | −9.3103 | −8.0106 | −7.4834 |
| F5 | 7.6997 | 8.0590 | 7.1517 | 8.8944 | 8.4579 | 8.0596 |
| SAG41 | 0.2679 | 0.4492 | 0.3630 | 0.7090 | 0.5334 | 0.5469 |
| D41 | 3.5000 | 3.9333 | 3.7975 | 4.1092 | 4.0045 | 4.0597 |
| SAG21 | −1.0505 | −1.2360 | −0.9229 | −1.2255 | −1.2594 | −1.2572 |
| D21 | 3.3305 | 3.7455 | 3.4512 | 3.8093 | 3.6207 | 3.6223 |
| SAG22 | −1.1092 | −1.3839 | −0.8977 | −1.0903 | −1.2054 | −1.2138 |
| D22 | 3.8751 | 4.5313 | 3.9336 | 4.3307 | 4.3261 | 4.3177 |
| TTL/F | 5.7606 | 4.3568 | 5.8887 | 4.3330 | 4.2994 | 4.3964 |
| TTL/H/FOV | 0.0972 | 0.1538 | 0.1115 | 0.1512 | 0.1520 | 0.1537 |
| D/H/FOV | 0.0178 | 0.0299 | 0.0212 | 0.0307 | 0.0307 | 0.0304 |
| BFL/TTL | 0.1532 | 0.1152 | 0.1863 | 0.1200 | 0.1176 | 0.1155 |
| |F5/F4| | 0.8843 | 1.1524 | 0.9501 | 0.9553 | 1.0558 | 1.0770 |
| |F6/F| | 180.4101 | 10.2302 | 101.8012 | 56.1779 | 24.7519 | 10.2128 |
| d6/TTL | 0.1234 | 0.0697 | 0.0667 | 0.0534 | 0.0635 | 0.0684 |
| d56/TTL | 0.0166 | 0.0391 | 0.0130 | 0.0833 | 0.0892 | 0.0565 |
| (FOV × F) /H | 62.7557 | 56.4768 | 59.3729 | 55.8153 | 56.5584 | 55.9377 |
| R11/(R12 + d1) | 3.0839 | 2.2118 | 2.4097 | 1.9110 | 2.1212 | 2.0716 |
| arctan(D41/(R41-SAG41)) | 0.1528 | 0.2274 | 0.1906 | 0.3417 | 0.2648 | 0.2678 |
| arctan(SAG21/D21)/ arctan(SAG22/D22) | 1.0959 | 1.0753 | 1.1646 | 1.2620 | 1.2319 | 1.2190 |

The present disclosure further provides an electronic device, which may include the optical lens assembly according to the above embodiments of the present disclosure and an imaging element used to convert an optical image formed by the optical lens assembly into an electrical signal. The electronic device may be an independent electronic device such as a detection distance camera, or may be an imaging module integrated into, for example, a detection distance device. In addition, the electronic device may be an independent imaging device such as a vehicle-mounted camera, or may be an imaging module integrated into, for example, a driving assistance system.

The foregoing is only a description for the preferred embodiments of the present disclosure and the applied technical principles. It should be appreciated by those skilled in the art that the scope of the present disclosure is not limited to the technical solution formed by the particular combination of the above technical features. The scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An optical lens assembly, comprising, sequentially along an optical axis from an object side to an image side:
   a first lens, having a negative refractive power, an object-side surface of the first lens being a convex surface, and an image-side surface of the first lens being a concave surface;
   a second lens, having a refractive power, an object-side surface of the second lens being a concave surface, and an image-side surface of the second lens being a convex surface;
   a third lens, having a positive refractive power;
   a fourth lens, having a refractive power, and an object-side surface of the fourth lens being a convex surface;

a fifth lens, having a refractive power, and an image-side surface of the fifth lens being a convex surface; and a sixth lens, having a refractive power, wherein the optical lens assembly comprises no more than six lenses, wherein a radius of curvature R11 of the object-side surface of the first lens, a radius of curvature R12 of the image-side surface of the first lens, and a distance d1 from a center of the object-side surface of the first lens to a center of the image-side surface of the first lens satisfy: R11/(R12+d1)≥1.55.

2. The optical lens assembly according to claim 1, wherein the fourth lens and the fifth lens are cemented to form a cemented lens.

3. The optical lens assembly according to claim 1, wherein a distance TTL from a center of the object-side surface of the first lens to an image plane of the optical lens assembly on the optical axis and a total effective focal length F of the optical lens assembly satisfy: TTL/F≤8; or the TTL and a distance BFL from a center of an image-side surface of the sixth lens to the image plane on the optical axis satisfy: BFL/TTL≥0.06.

4. The optical lens assembly according to claim 1, wherein a distance TTL from a center of the object-side surface of the first lens to an image plane of the optical lens assembly on the optical axis, half of a maximal field-of-view FOV of the optical lens assembly and half of an image height H corresponding to the maximal field-of-view of the optical lens assembly satisfy: TTL/H/FOV≤0.3; the FOV, a maximal half-aperture D of the object-side surface of the first lens corresponding to the maximal field-of-view of the optical lens assembly and the H satisfy: D/H/FOV≤0.1; or a total effective focal length F of the optical lens assembly, the FOV and the H satisfy: (FOV×F)/H≤70°.

5. The optical lens assembly according to claim 1, wherein an effective focal length F4 of the fourth lens and an effective focal length F5 of the fifth lens satisfy: 0.4≤|F5/F4|≤2.5.

6. The optical lens assembly according to claim 1, wherein an effective focal length F6 of the sixth lens and a total effective focal length F of the optical lens assembly satisfy: |F6/F|≥2.3.

7. The optical lens assembly according to claim 1, wherein a distance d2 from a center of the object-side surface of the second lens to a center of the image-side surface of the second lens and a distance TTL from a center of the object-side surface of the first lens to an image plane of the optical lens assembly on the optical axis satisfy: d2/TTL≤0.25; or a distance d6 from a center of an object-side surface of the sixth lens to a center of an image-side surface of the sixth lens and the distance TTL satisfy: d6/TTL≤0.25; or wherein a spacing distance d56 from a center of the image-side surface of the fifth lens to a center of an object-side surface of the sixth lens on the optical axis and a distance TTL from a center of the object-side surface of the first lens to an image plane of the optical lens assembly on the optical axis satisfy: 0.009≤d56/TTL≤0.25.

8. The optical lens assembly according to claim 1, wherein a radius of curvature R21 of the object-side surface of the second lens, a radius of curvature R22 of the image-side surface of the second lens, and a distance d2 from a center of the object-side surface of the second lens to a center of the image-side surface of the second lens satisfy: 0.5≤(|R21|+d2)/|R22|≤2; or wherein a radius of curvature R11 of the object-side surface of the first lens, a radius of curvature R12 of the image-side surface of the first lens, and a distance d1 from a center of the object-side surface of the first lens to a center of the image-side surface of the first lens satisfy: 1.55≤R11/(R12+d1)≤3.0839.

9. The optical lens assembly according to claim 1, wherein a conditional expression is satisfied: arctan(D41/(R41−SAG41))≥0.02, or 0.5≤arctan(SAG21/D21)/arctan(SAG22/D22)≤3, wherein, R41 is a radius of curvature of the object-side surface of the fourth lens; D41 is a maximal half-aperture of the object-side surface of the fourth lens corresponding to a maximal field-of-view of the optical lens assembly; SAG41 is a sag height Sg value of the object-side surface of the fourth lens corresponding to the maximal field-of-view of the optical lens assembly; D21 is a maximal half-aperture of an object-side surface of the second lens corresponding to the maximal field-of-view of the optical lens assembly; D22 is a maximal half-aperture of an image-side surface of the second lens corresponding to the maximal field-of-view of the optical lens assembly; SAG21 is a distance from an intersection of the object-side surface of the second lens and the optical axis to the maximal half-aperture of the object-side surface of the second lens on the optical axis; and SAG22 is a distance from an intersection of the image-side surface of the second lens and the optical axis to the maximal half-aperture of the image-side surface of the second lens on the optical axis.

10. The optical lens assembly according to claim 1, wherein a radius of curvature R21 of the object-side surface of the second lens, a radius of curvature R22 of the image-side surface of the second lens, and a distance d2 from a center of the object-side surface of the second lens to a center of the image-side surface of the second lens satisfy: 1.0911≤(|R21|+|d2|)/|R22|≤2; or a distance BFL from a center of an image-side surface of the sixth lens to an image plane of the optical lens assembly on the optical axis and a distance TTL from a center of the object-side surface of the first lens to the image plane on the optical axis satisfy: 0.06≤BFL/TTL≤0.1863.

11. The optical lens assembly according to claim 1, wherein the second lens has a positive refractive power or a negative refractive power.

12. The optical lens assembly according to claim 1, wherein the third lens has a convex object-side surface and a convex image-side surface.

13. The optical lens assembly according to claim 1, wherein the fourth lens has a negative refractive power, a convex object-side surface, and a concave image-side surface; and the fifth lens has a positive refractive power, a convex object-side surface, and a convex image-side surface.

14. The optical lens assembly according to claim 1, wherein the sixth lens has a positive refractive power or a negative refractive power.

15. The optical lens assembly according to claim 1, wherein the sixth lens has:

a convex object-side surface and a concave image-side surface;

a concave object-side surface and a concave image-side surface;

a concave object-side surface and a convex image-side surface; or a convex object-side surface and a convex image-side surface.

16. The optical lens assembly according to claim 1, satisfying at least one of following conditional expressions:

4.1721≤TTL/F≤8;
0.0972≤TTL/H/FOV≤0.3;
0.0178≤D/H/FOV≤0.1; or
55.815≤(FOV×F)/H≤70;

wherein TTL is a distance from a center of the object-side surface of the first lens to an image plane of the optical lens assembly on the optical axis; F is a total effective focal length of the optical lens assembly; FOV is half of a maximal field-of-view of the optical lens assembly; H is half of an image height corresponding to the maximal field-of-view of the optical lens assembly; and D is a maximal half-aperture of the object-side surface of the first lens corresponding to the maximal field-of-view of the optical lens assembly.

17. The optical lens assembly according to claim 1, satisfying at least one of following conditional expressions:

0.4≤|F5/F4|≤1.1524;
2.3≤|F6/F|≤180.4087;
0.1429≤d2/TTL≤0.25;
0.053≤d6/TTL≤0.25;
0.009≤d56/TTL≤0.0892;
1.55≤R11/(R12+d1)≤3.0839;
0.02≤arctan(D41/(R41−SAG41))≤0.3990; or
1.0753≤arctan(SAG21/D21)/arctan(SAG22/D22)≤3;

wherein F4 is an effective focal length of the fourth lens; F5 is an effective focal length of the fifth lens; F6 is an effective focal length of the sixth lens; F is a total effective focal length of the optical lens assembly; d2 is a distance from a center of the object-side surface of the second lens to a center of the image-side surface of the second lens; TTL is a distance from a center of the object-side surface of the first lens to an image plane of the optical lens assembly on the optical axis; d6 is a distance from a center of an object-side surface of the sixth lens to a center of an image-side surface of the sixth lens; d56 is a spacing distance from a center of the image-side surface of the fifth lens to a center of the object-side surface of the sixth lens on the optical axis; R11 is a radius of curvature of the object-side surface of the first lens; R12 is a radius of curvature of the image-side surface of the first lens; d1 is a distance from a center of the object-side surface of the first lens to a center of the image-side surface of the first lens; D41 is a maximal half-aperture of the object-side surface of the fourth lens corresponding to a maximal field-of-view of the optical lens assembly; R41 is a radius of curvature of the object-side surface of the fourth lens; SAG41 is a distance from an intersection of the object-side surface of the fourth lens and the optical axis to the maximal half-aperture of the object-side surface on the optical axis; D21 is a maximal half-aperture of the object-side surface of the second lens corresponding to the maximal field-of-view of the optical lens assembly; D22 is a maximal half-aperture of the image-side surface of the second lens corresponding to the maximal field-of-view of the optical lens assembly; SAG21 is a distance from an intersection of the object-side surface of the second lens and the optical axis to the maximal half-aperture of the object-side surface of the second lens on the optical axis; and SAG22 is a distance from an intersection of the image-side surface of the second lens and the optical axis to the maximal half-aperture of the image-side surface of the second lens on the optical axis.

18. The optical lens assembly according to claim 1, satisfying at least one of following conditional expressions:

4.1721≤TTL/F≤5.8887;
0.1055≤BFL/TTL≤0.1863;
0.0972≤TTL/H/FOV≤0.1544;
0.0178≤D/H/FOV≤0.0315; or
55.815≤(FOV×F)/H≤62.7562;

wherein TTL is a distance from a center of the object-side surface of the first lens to the image plane of the optical lens assembly on the optical axis; F is a total effective focal length of the optical lens assembly; BFL is a distance from a center of the image-side surface of the sixth lens to an image plane of the optical lens assembly on the optical axis; FOV is half of a maximal field-of-view of the optical lens assembly; His half of an image height corresponding to a maximal field-of-view of the optical lens assembly; D is a maximal half-aperture of the object-side surface of the first lens corresponding to the maximal field-of-view of the optical lens assembly.

19. The optical lens assembly according to claim 1, satisfying at least one of following conditional expressions:

0.6221≤|F5/F4|≤1.1524;
3.6352≤|F6/F|≤180.4087;
0.1429≤d2/TTL≤0.1855;
0.053≤d6/TTL≤0.1234;
0.009≤d56/TTL≤0.25;
1.0911≤(|R21|+|d2|)/|R22|≤1.6095;
1.7907≤R11/(R12+d1)≤3.0839;
0.1528≤arctan(D41/(R41−SAG41))≤0.3990; or
1.0753≤arctan(SAG21/D21)/arctan(SAG22/D22)≤1.2620;

wherein F4 is the effective focal length of the fourth lens; F5 is an effective focal length of the fifth lens; F6 is an effective focal length of the sixth lens; F is a total effective focal length of the optical lens assembly; d2 is a distance from a center of the object-side surface of the second lens to a center of the image-side surface of the second lens; TTL is a distance from a center of the object-side surface of the first lens to the image plane of the optical lens assembly on the optical axis; d6 is a distance from a center of the object-side surface of the sixth lens to a center of the image-side surface of the sixth lens; d56 is a spacing distance from a center of the image-side surface of the fifth lens to a center of the object-side surface of the sixth lens on the optical axis; R21 is a radius of curvature of the object-side surface of the second lens; R22 is a radius of curvature of the image-side surface of the second lens; R11 is a radius of curvature of the object-side surface of the first lens; R12 is a radius of curvature of the image-side surface of the first lens; d1 is a distance from a center of the object-side surface of the first lens to a center of the image-side surface of the first lens; D41 is a maximal half-aperture of the object-side surface of the fourth lens corresponding to the maximal field-of-view of the optical lens assembly; R41 is a radius of curvature of the object-side surface of the fourth lens; SAG41 is a distance from an intersection of the object-side surface of the fourth lens and the optical axis to the maximal half-aperture of the object-side surface on the optical axis; D21 is a maximal half-aperture of the object-side surface of the second lens corresponding to the maximal field-of-view of the optical lens assembly; D22 is a maximal half-aperture of the image-side surface of the second lens corresponding to the maximal field-of-view of the optical lens assembly; SAG21 is a distance from an intersection of the object-side surface of the second lens and the optical axis to the maximal half-aperture of the object-side surface of the second lens on the optical axis; and SAG22 is a distance from an intersection of the image-side surface of the second lens and the optical axis to the maximal half-aperture of the image-side surface of the second lens on the optical axis.

20. An electronic device, comprising an optical lens assembly and an imaging element used to convert an optical image formed by the optical lens assembly into an electrical signal;

wherein the optical lens assembly comprises, sequentially along an optical axis from an object side to an image side:

a first lens, having a negative refractive power, an object-side surface of the first lens being a convex surface, and an image-side surface of the first lens being a concave surface;

a second lens, having a refractive power, an object-side surface of the second lens being a concave surface, and an image-side surface of the second lens being a convex surface;

a third lens, having a positive refractive power;

a fourth lens, having a refractive power, and an object-side surface of the fourth lens being a convex surface;

a fifth lens, having a refractive power, and an image-side surface of the fifth lens being a convex surface; and a sixth lens, having a refractive power, wherein the optical lens assembly comprises no more than six lenses, wherein a radius of curvature R11 of the object-side surface of the first lens, a radius of curvature R12 of the image-side surface of the first lens, and a distance d1 from a center of the object-side surface of the first lens to a center of the image-side surface of the first lens satisfy: $R11/(R12+d1) \geq 1.55$.

* * * * *